(12) United States Patent
Chen et al.

(10) Patent No.: US 10,389,563 B2
(45) Date of Patent: Aug. 20, 2019

(54) SYSTEMS AND METHODS FOR WI-FI HIGH EFFICIENCY PREAMBLES FOR RESOURCE UNIT ALLOCATION

(71) Applicant: INTEL IP CORPORATION, Santa Clara, CA (US)

(72) Inventors: Xiaogang Chen, Beijing (CN); Qinghua Li, San Ramon, CA (US); Robert Stacey, Portland, OR (US); Yuan Zhu, Beijing (CN); Chittabrata Ghosh, Fremont, CA (US); Po-Kai Huang, Santa Clara, CA (US); Rongzhen Yang, Shanghai (CN); Huaning Niu, Milpitas, CA (US); Jeongho Jeon, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 304 days.

(21) Appl. No.: 14/866,167

(22) Filed: Sep. 25, 2015

(65) Prior Publication Data

US 2016/0330058 A1 Nov. 10, 2016

Related U.S. Application Data

(60) Provisional application No. 62/157,304, filed on May 5, 2015, provisional application No. 62/157,376, filed on May 5, 2015.

(51) Int. Cl.
*H04L 27/26* (2006.01)
*H04B 7/0452* (2017.01)
(Continued)

(52) U.S. Cl.
CPC ....... *H04L 27/2607* (2013.01); *H04B 7/0452* (2013.01); *H04W 28/065* (2013.01);
(Continued)

(58) Field of Classification Search
None
See application file for complete search history.

(56) References Cited

U.S. PATENT DOCUMENTS

2014/0307612 A1* 10/2014 Vermani ............... H04L 5/0044
370/312
2015/0319747 A1* 11/2015 Chu .................. H04W 72/0406
370/330
(Continued)

OTHER PUBLICATIONS

Final Rejection for U.S. Appl. No. 14/978,933, dated Feb. 23, 2018, 26 pages.
(Continued)

*Primary Examiner* — Jeffrey M Rutkowski
*Assistant Examiner* — Mehedi S Aley
(74) *Attorney, Agent, or Firm* — Eversheds Sutherland (US) LLP

(57) ABSTRACT

Systems, apparatus, and methods to provide an indication of frequency resource unit (RU) allocation from a wireless access point (AP) to one or more station devices (STA) are disclosed. The AP may be configured to generate a protocol data unit including a high efficiency wireless (HEW) preamble that indicates the RU allocation corresponding to each of the STA. The indication of the RU allocation for each of the STA, as disclosed herein, may be encoded in fewer bits than providing a bitmap of the RU allocation for each of the STA. A predetermined RU pattern may be used to map RU (e.g., 26 tone units, 52 tone units, etc.) to a RU allocation index. This RU allocation pattern may be efficiently communicated to each of the STAs in the HEW preamble of the protocol data unit.

17 Claims, 26 Drawing Sheets

(51) Int. Cl.
*H04W 28/06* (2009.01)
*H04W 72/04* (2009.01)
*H04W 72/12* (2009.01)
*H04W 84/12* (2009.01)

(52) U.S. Cl.
CPC ....... *H04W 72/04* (2013.01); *H04W 72/1289* (2013.01); *H04W 84/12* (2013.01)

(56) References Cited

U.S. PATENT DOCUMENTS

| | | | |
|---|---|---|---|
| 2015/0365947 A1 | 12/2015 | Suh | |
| 2016/0066338 A1* | 3/2016 | Kwon | H04L 5/0007 370/330 |
| 2016/0330718 A1* | 11/2016 | Kim | H04L 5/0091 |

OTHER PUBLICATIONS

Non-Final Rejection for U.S. Appl. No. 14/978,933, dated Sep. 12, 2017, 22 pages.

\* cited by examiner

SYSTEMS AND METHODS FOR WI-FI HIGH EFFICIENCY PREAMBLES FOR RESOURCE UNIT ALLOCATION

CROSS-REFERENCE TO RELATED APPLICATIONS

This application claims the benefit of U.S. Provisional Application No. 62/157,304, filed May 5, 2015, and U.S. Provisional Application No. 62/157,376, also filed May 5, 2015.

TECHNICAL FIELD

This disclosure generally relates to systems and methods for Wi-Fi, and more particularly to resource unit (RU) allocation in high efficiency (HE) Wi-Fi preambles.

BACKGROUND

Wireless devices are becoming widely prevalent and users of such devices are increasingly requesting access to wireless channels high speed and reliability. Next generation wireless technologies and standards are under development meet such demands. One such next generation wireless local area network (WLAN), IEEE 802.11ax or High-Efficiency WLAN (HEW), is under development. HEW utilizes Orthogonal Frequency-Division Multiple Access (OFDMA) in channel allocation.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Figure 1:
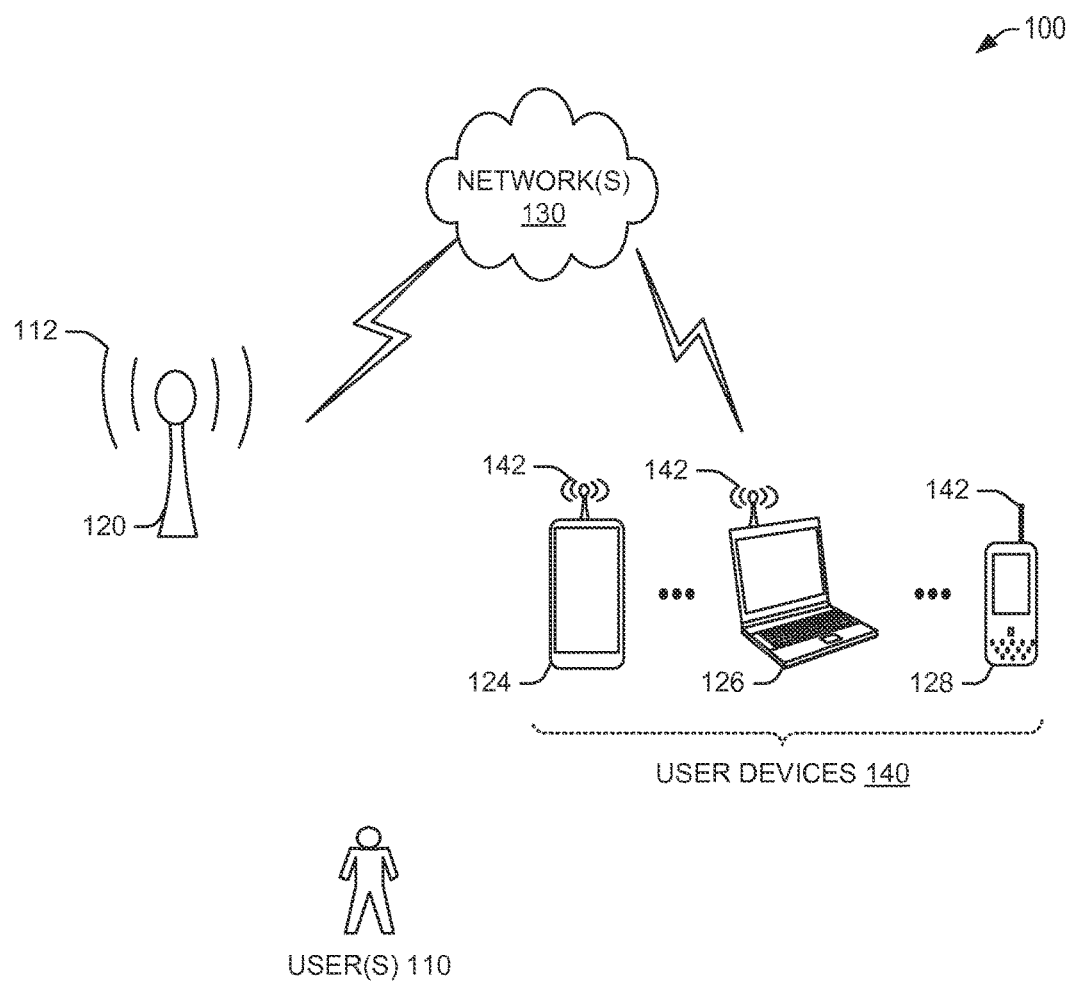
FIG. 1 depicts a simplified schematic diagram of an example environment with a wireless local area network (WLAN) with an access point (AP) and one or more user devices, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Embodiments of the disclosure may provide systems, apparatus, and methods for allocating resources of a wireless local area network (WLAN), such as a high efficiency wireless local area network (HEW) that may operate according to any variety of standards. In example embodiments, the systems, apparatus, and methods, as described herein, may operate in accordance with Institute of Electrical and Electronics Engineers (IEEE) 802.11ax standards or modifications thereto. In example embodiments, the HEW may operate in any suitable mode, including orthogonal frequency division multiple access (OFDMA) mode, multi-user multi-input multi-output (MU-MIMO) mode, and/or single user mode.

In accordance with example embodiments, a Wi-Fi access point (AP) may be configured to identify a number of user devices or stations (STA) with which it is to facilitate wireless communications. The STAs may be identified by any variety of handshaking procedures, such as procedures involving the broadcast of beacons from the AP and/or a request for connection by the STAs, etc. The AP may allocate a partial access identification (PAID) to each of the STAs during the handshaking procedure. The AP may then allocate frequency and/or temporal resources to the STAs with which it is to communicate. The AP may provide an indication of a frequency resource unit (RU) to each of the STAs with which the AP is to communicate and provide WLAN services.

The RUs, in example embodiments, may be a collection of tones within a channel (e.g., partitions of the total bandwidth of the channel). As a non-limiting example, a 20 MHz channel may be divided into 256 tones, 242 of which may be used for data transmission and/or reception. As another non-limiting example, a 40 MHz channel may be divided into 512 tones, 484 of which may be used for data transmission and/or reception. As yet another non-limiting example, a 80 MHz channel may be divided into 1024 tones, 968 of which may be used for data transmission and/or reception. It will be appreciated that there may be any suitable channel bandwidth and number of tones in accordance with example embodiments of the disclosure and that the disclosure is not limited to the examples discussed herein. A RU may have any variety of size in the frequency domain. For example a minimum sized RU may include 26 tones. Other RUs may have 52 tones, 106 tones, 242 tones, 484 tones, or the like.

In example embodiments, the AP may generate a physical layer convergence protocol (PCPL) protocol data unit (PPDU) that includes a payload section and a high efficiency wireless (HEW) preamble section. The preamble section may include a number of portions. In example embodiments, there may be a legacy preamble portion (L-SIG) that may enable the PPDU to be backward compatible for communications with STAs that may be operating using standards prior to IEEE 802.11 ax. The HEW preamble may further include a HE-SIG-A portion and a HE-SIG-B portion. The HE-SIG-A portion may provide information that enables the decoding of the HE-SIG-B section by the STAs that receive the PPDU. This information may include, for example, modulation and coding scheme (MCS) of the HE-SIG-B, the length of HE-SIG-B, and/or the guard interval (GI) length of HE-SIG-B. In example embodiments, the HE-SIG-A may also provide timing information related to the duration of the current RU allocations for each of the STAs.

The HE-SIG-B, in some example embodiments, may only have a STA specific part. In these example embodiments, the STA specific part may include a portion carrying information for each of the STAs with which the AP is to communicate and provide a corresponding RU allocation. The information for each of the STA may include the PAID of the STA to indicate to the STA to listen, a RU allocation index that indicates the RU allocation for that STA, a MCS index to indicate the modulation and coding scheme (MCS) for that STA, and a CRC. In accordance with example embodiments of the disclosure, there may be fewer or additional data items that may be communicated to each of the STAs via the STA specific part of the HE-SIG-B. The RU allocation index may, in example embodiments, indicate a particular RU allocation in a fixed RU pattern. For example, a 20 MHz channel may be divided into 15 possible RU allocation blocks and set as a RU pattern for that 20 MHz channel. In this case, the 15 different RU allocation blocks may be indexed (e.g., such as by using 4 bits). Therefore, with a 20 MHz channel, in example embodiments, a 4 bit RU allocation index may be communicated to each STA within the STA specific part of the HE-SIG-B to indicate a corresponding RU allocation for each of the STAs. The STAs may be preprogrammed with the mapping of the RU allocation index to particular RUs, such that the STA may determine its RU allocation as assigned by the AP. The 4 bit RU allocation index of the 20 MHz channel may be shorter for each of the STAs than conveying this information using a bitmap (e.g., 9 bit bitmap). It will be appreciated that in a 40 MHz channel with a minimum RU size of 26 tones, a 5 bit RU allocation index may be used. Furthermore, in a 80 MHz channel with a minimum RU size of 26 tones, a 7 bit RU allocation index may be used. It is seen, therefore, that by having a fixed RU pattern, each of the potential RU allocations may be indexed and communicated relatively more efficiently to the STAs than if a bitmap was transmitted to each of the STAs.

In other example embodiments, the HE-SIG-B may include both a common part and a STA specific part. The common part may be used by all of the STAs with which the AP is to provide an RU allocation. This common part may include a RU pattern index, that references a particular RU pattern or mapping of RU within a channel. Once the STAs identify the RU pattern from the common part, the STAs will know the RU allocation indexes associated with that RU pattern. In this case, the AP, in the STA specific part of the HE-SIG-B, may indicate, for each STA (e.g., as referenced by each STA's PAID) the RU allocation index referenced to the RU pattern index, as indicated in the common part of the HE-SIG-B. In this way, a fewer number of bits may be communicated to each of the STAs within the STA specific part of the HE-SIG-B. Accordingly, a fewer number of bits may be used for the purposes of the RU allocation to the STAs in the PPDU.

When the AP and the STAs operate in MU-MIMO mode, in example embodiments, the channels may not partitioned with as fine a granularity as when operating in OFDMA mode. In this case, the channel may be partitioned into larger sub-channel(s). For example, a block of 26 tones may not be used in MU-MIMO mode. Instead, in example embodiments, a minimum size multi-user (MU) partition may be 20 MHz. Thus in this case, a 20 MHz channel may only have one MU partition (e.g., the whole 20 MHz channel). A 40 MHz channel in MU-MIMO mode may be divided into two 20 MHz MU partitions or one 40 MHz MU partition. Similarly, a 80 MHz channel may be partitioned into one 80 MHz MU partition, two 40 MHz MU partitions, four 20 MHz MU partitions, or one 40 MHz MU partition and two 20 MHz MU partitions. Additionally, in MU-MIMO mode, spatial partitions are also to be allocated to the STAs that are to communicate with the AP.

In example embodiments, when operating in MU-MIMO mode, the AP may use a HE-SIG-B with both a common part and STA specific parts for each of the STAs with which the AP is to communicate. In these example embodiments, the MU partition may be indicated in the HE-SIG-A portion of the preamble structure of the PPDU and the spatial partitions (e.g., stream allocations) may be indicated in the HE-SIG-B common part. In some example embodiments, the field in the HE-SIG-A portion that indicates the length of HE-SIG-B may be used to indicate the number of MU partitions of the channel. The STAs may be configured to determine the length of the HE-SIG-B common part based at least in part on the MU partition information in HE-SIG-A. In the HE-SIG-B common part, spatial indices for each MU partition may be provided. At this point, the combination of the HE-SIG-A and HE-SIG-B common part provides information about the total channel size bandwidth (e.g., 20 MHz, 40 MHz, 80 MHz, etc.), the total number of MU partitions, and the spatial partitions (e.g., groups of streams allocated to each of the MU partitions). The HE-SIG-B STA specific part may include an ordered identifier of each of the STAs, such that based at least in part on the order of a particular STA in the HE-SIG-B in the STA specific part of the HE-SIG-B, the STA may identify its MU partition and spatial partition. In these example embodiments, the STA may identify its own PAID and then determine the order of its PAID relative to other STAs. Using the determined order, the STA may identify its particular MU partition and spatial partition based at least in part on the information carried in the HE-SIG-A and the HE-SIG-B common part.

In some example embodiments, when operating in MU-MIMO mode, the AP may use a HE-SIG-B with only a STA specific part and no common part. In these cases, the each of the STA specific parts, corresponding to each of the STAs with which the AP is to communicate, may carry information including the identification of the corresponding STA, an index indicating a MU partition for that STA, and an index indicating a spatial partition for that STA. The data grouping of the STA identifier, allocated MU partition, and allocated stream(s) may be provided for each of the STAs to which the PPDU is to be sent by the AP.

FIG. 1 depicts a simplified schematic diagram of an example environment 100 with a wireless local area network (WLAN) 130 with an access point (AP) 120 and one or more user devices 124, 126, 128, in accordance with example embodiments of the disclosure. In example embodiments, the one or more user devices 124, 126, 128 and one or more access point(s) (AP) 120 may communicate in accordance with IEEE 802.11 communication standards, including IEEE 802.11 ax or modifications thereto. The computing device(s), user device(s), or stations 124, 126, 128 (hereinafter referred to individually or collectively as STA 140 or STAs 140, respectively) may be mobile devices that are non-stationary and do not have fixed locations. Alternatively, the STAs may be stationary device. The one or more APs 120 may be stationary and have fixed locations, in some example embodiments. In other example embodiments, the AP 120 may also be mobile.

In accordance with some IEEE 802.11 standards, including, for example IEEE 802.11ax (High-Efficiency WLAN (HEW)) embodiments, the AP 120 may operate as a master station which may be arranged to contend for a wireless medium (e.g., during a contention period) to receive exclusive control of the medium for an HEW control period. The master station may transmit an HEW master-sync transmission at the beginning of the HEW control period. During the HEW control period, HEW stations 140 may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, in some example embodiments, during the HEW control period, legacy stations may refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

One or more illustrative user device(s) 120 may be operable by one or more users 110. The user device(s) 120 may include any suitable processor-driven user device including, but not limited to, a desktop computing device, a set-top box (STB), a game console, a laptop computing device, a server, a router, a notebook computer, a netbook computer, a web-enabled television, a switch, a smartphone, a tablet, wearable wireless device (e.g., bracelet, watch, glasses, ring, etc.), combinations thereof, or the like.

Any of the STA(s) 140 (e.g., user devices 124, 126, 128), and AP 110 may be configured to communicate with each other via one or more communications networks 130 wirelessly. Indeed the communications network (e.g., WLAN 130) may be established and used according to the systems, apparatus, and methods, as described herein. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, WLAN 130 may configured to connect to any type of medium over which network traffic may be carried via the AP 110 including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the STA(s) 140 (e.g., user devices 124, 126, 128), and AP 120 may include one or more communications antennae 112, 142. Communications antenna may be any suitable type of antenna corresponding to the communications protocols used by the user device(s) 140 (e.g., user devices 124, 124 and 128), and AP 120. Some non-limiting examples of suitable communications antennas 112, 142 include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

In example embodiments, the AP 120 may be configured to receive an indication of STAs 140 that would like to interact and receive network 130 connectivity via the AP 120. The AP 120, in example embodiments, may receive an indication from each of the STAs 140 requesting communications resources (e.g., RU allocation, MU partitions, spatial partitions, etc.). In example embodiments, the AP 120 may be aware of the STAs 140 with which it is to interact by one or more handshaking processes performed with the STAs 140. Such handshaking processes may result in identification and/or assignment of identification (e.g., partial access identification (PAID), etc.) by the AP 120 for each of the STAs 140.

When the STAs 140 have been identified by the AP 120, in example embodiments, the AP 120 may be configured to determine an allocation of communications resources for each of the STAs 140. In some example embodiments, the determination of resources to allocate to each of the STAs 140 may be based at least in part on a request for communication resources and/or an indication of the communication resource needs of the various STAs 140 with which the AP 120 is to interact.

The AP 120, after determining the mode in which to operate and the resources to allocate to each of the STAs, may generate a PPDU with a preamble that indicates the resources that are allocated to each of the STAs. This indication of the resources in OFDMA mode may be of indexed blocks of tones and/or ordered blocks of tones. In the case of MU-MIMO mode, particularly when the HE-SIG-B includes a common part and a STA specific part, the indication of the resources may in based on ordering a listing of the resources (e.g., MU partition and/or spatial partitions) and matching the ordering to an ordering of the STAs, such as a ordered listing of the STAs in a STA specific portion of the HE-SIG-B. Alternatively, in the MU-MIMO mode, when the HE-SIG-B has only a STA specific part, the MU partition and the spatial partition may each be indexed for each of the STAs in the STA specific part of the HE-SIG-B.

Figure 2:
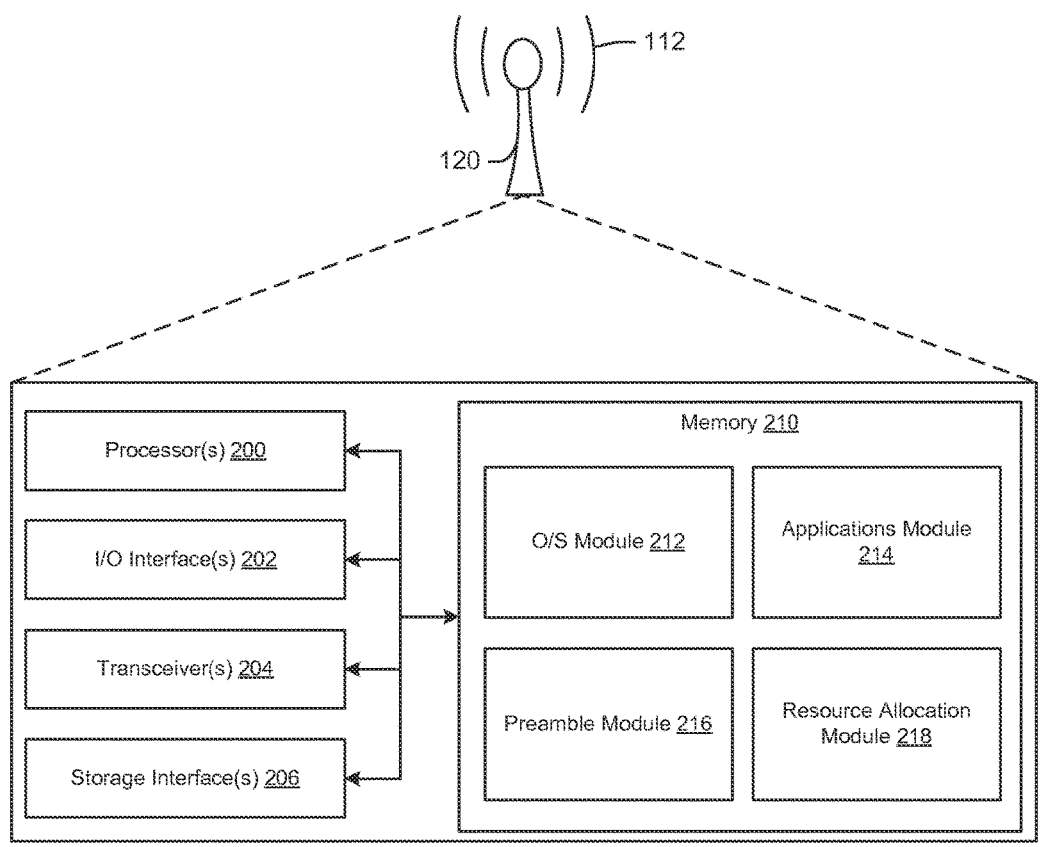
FIG. 2 depicts a simplified block diagram illustrating an example architecture of the AP of the example WLAN of FIG. 1, in accordance with example embodiments of the disclosure.

FIG. 2 depicts a simplified block diagram illustrating an example architecture of the AP 120 of the example WLAN 100 of FIG. 1, in accordance with example embodiments of the disclosure. The AP 120 may include one or more antennas 112. The AP 120 may further include one or more processor(s) 200, one or more I/O interface(s) 202, one or more transceiver(s) 204, one or more storage interface(s) 206, and one or more memory or storage 210.

The communications antenna 112 may be any suitable type of antenna corresponding to the communications protocols used by the AP 110. Some non-limiting examples of suitable communications antennas 112 include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to the transceiver 204 to transmit and/or receive signals, such as communications signals to and/or from STAs 140.

The processor(s) 200 of the AP 110 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The AP 110 may also include a chipset (not shown) for controlling communications between one or more processors 200 and one or more of the other components of the AP 110. The processors 200 may also include one or more application specific integrated circuits (ASICs) or application specific standard products (ASSPs) for handling specific data processing functions or tasks. In certain embodiments, the AP 110 may be based on an Intel® Architecture system and the one or more processors 200 and chipset may be from a family of Intel® processors and chipsets, such as the Intel® Atom® processor family.

The one or more I/O interfaces 202 may enable the use of one or more (I/O) device(s) or user interface(s), such as a keyboard and/or mouse. The storage interface(s) 206 may enable the AP 110 to store information, such as status and/or location information or deployment information in storage devices and/or memory 210.

The transmit/receive or radio component 204 may include any suitable radio for transmitting and/or receiving radio frequency (RF) signals in the bandwidth and/or channels corresponding to the communications protocols utilized by the AP 120 to communicate with STAs 140 or other APs 120. The transceiver 204 may include hardware and/or software to modulate communications signals according to pre-established transmission protocols. The transceiver 204 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the transceiver 204, in cooperation with the communications antennas 112, may be configured to communicate via 2.4 GHz channels (e.g. 802.11b, 802.11g, 802.11n), 5 GHz channels (e.g. 802.11n, 802.11ac), or 60 GHZ channels (e.g. 802.11 ad), or 802.11 ax standards. In alternative embodiments, non-Wi-Fi protocols may be used for communications between adjacent AP 110, such as Bluetooth, dedicated short-range communication (DSRC), or other packetized radio communications. The transceiver 204 may include any known receiver and baseband suitable for communicating via the communications protocols of AP 120. The radio component may further include a low noise amplifier (LNA), additional signal amplifiers, an analog-to-digital (A/D) converter, one or more buffers, and digital baseband.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) 212, an applications module 214, a preamble module 216, and a resource allocation module 218. Each of the modules and/or software may provide functionality for the AP 110, when executed by the processors 200. The modules and/or the software may or may not correspond to physical locations and/or addresses in memory 210. In other words, the contents of each of the modules 212, 214, 216, 218 may not be segregated from each other and may, in fact be stored in at least partially interleaved positions on the memory 210.

The O/S module 212 may have one or more operating systems stored thereon. The processors 200 may be configured to access and execute one or more operating systems stored in the (O/S) module 212 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more functionality associated with the resource unit (RU) allocation to each of the STAs 140 and communications with the STAs 140. These instructions and/or applications may, in certain aspects, interact with the (O/S) module 212 and/or other modules of the AP 120. The applications module 214 may have instructions, software, and/or code stored thereon that may be launched and/or executed by the processors 200 to execute one or more applications and functionality associated therewith, including, for example, functionality associated with allocating communicative resources to one or more STAs 140.

The preamble module 216 may have instructions stored thereon that, when executed by the processors 200, enable the AP 120 to provide a variety of preamble generation of the PPDU and communications functionality. In one aspect, the processors 200 may be configured to generate a legacy portion of the HEW preamble (L-SIG), HE-SIG-A, and HE-SIG-B. In example embodiments, the HE-SIG-B, additionally may carry a RU allocation index corresponding to each of the STAs to which an RU allocation is to be made that may be a fixed index or an index referenced to a RU pattern. This RU allocation index may indicate the RU that is being assigned to each of the STAs. The RU allocation index may be indexed to predetermined blocks that may be allocated and a constellation thereof.

The processor(s) 200 may further be configured to order, in sequence, RU partitions of STAs 140 in a common part of the HE-SIG-B signaling field. The processor(s) 200 may still further be configured to order the STAs and their identifiers in the STA specific part of the HE-SIG-B in a manner such that the order of the STAs in the STA specific part corresponds to the order of the RUs in the HE-SIG-B common part. Thus, in this way, the processor(s) 200 may be configured to communicate RU information to the STAs 140 that it services in a relatively efficient and compact manner.

The processor(s) 200 may still further be configured, in MU-MIMO mode, to provide an indication of the MU partitions in a HE-SIG-A portion of the preamble. In example embodiments, the HE-SIG-A and/or legacy preamble portions may be generated by the processor(s) 200 to carry an indication that MU-MIMO mode of operation is to be used. The processor(s) 200 may also be configured to generate the HE-SIG-A to carry an indication of the total channel bandwidth available in MU-MIMO mode (e.g., 20 MHz channel, 40 MHz channel, or 80 MHz channel). HE-SIG-A may still further carry an indication of a MU partition scheme. In the case of a 20 MHz channel with a minimum 20 MHz partition, there may only be one option for MU partitions (e.g., a single 20 MHz partition or the whole channel bandwidth). In this case, no bits may be needed to indicate the MU partition scheme, since a STA device 140 would know from the MU-MIMO mode of operation and the minimum partition size, that there is only one partition scheme. In the case of a 40 MHz channel with a minimum 20 MHz MU partition, there may be two options for MU partition scheme: 1. One 40 MHz MU partition; or 2. Two 20 MHz partitions. In this case, the processor(s) 200 may be configured to use a single bit (e.g., each of the two states (0 or 1) of the single bit indicating one each of the possible MU partition schemes) may be used to indicate the MU partition scheme within the HE-SIG-A field. For the case of 80 MHz channel with a minimum 20 MHz partition, as discussed above, there may be seven different MU partition schemes. Thus, the processor(s) 200 may be configured to use three bits in the HE-SIG-A to represent any of the seven MU partition schemes. In this way, the processor(s) 200 may be configured to generate a HE-SIG-A field that indicates the MU partition scheme to the STAs via the preamble of the PPDU.

The processor(s) 200, by executing the instructions in the preamble module 216 may still further be configured to indicate spatial partitions in a common part of a HE-SIG-B partition. In some example embodiments, there may be 4 potential streams per MU partition. In the case of 4 potential streams per MU partition, there may be as many as 10 different permutations of the stream allocation within each MU partition. Thus, the 10 possibilities of allocating the streams may be indexed by 4 bits within the HE-SIG-B common part for each MU partition. In other example embodiments, there may be 8 potential streams per MU partition. In the case of 8 potential streams per MU partition, there may be as many as 66 different permutations, as shown in Table 3 below) of the stream allocation within each MU partition. Thus, the 66 possibilities of allocating the streams may be indexed by 7 bits within the HE-SIG-B common part for each MU partition. It will be appreciated that based at least in part on the number of MU partitions and spatial partitions, each of the STAs 140 may be able to identify how many STAs 140 are to be allocated resources under MU-MIMO by the processor(s) 200. Each of the STAs may further recognize, based at least in part on a predetermined number of bits corresponding to each STA in the STA specific part of HE-SIG-B, how long the HE-SIG-B STA specific part is and when a particular STA's (e.g., self) information is to be ascertained.

The processor(s) 200 may still further be configured to order identifiers (e.g., PAID) of the STAs 140 with which it is to communicate in an order such that the order corresponds with the order of the MU partitions, as indicated in the HE-SIG-A, and the order of the spatial partitions in the common part of HE-SIG-B. It will be appreciated that in MU-MIMO mode, the channels may not be partitioned in as fine of a granularity as in the OFDMA mode. In these example embodiments, the STA may identify its own PAID and then determine the order of its PAID relative to other STAs. Using the determined order, the STA may identify its particular MU partition and spatial partition based at least in part on the information carried in the HE-SIG-A and the HE-SIG-B common part.

For example, if there are three STAs 140 for which the processor(s) 200 are allocating MU resources of a 40 MHz channel with up to 8 streams per MU partition, the AP 110 may indicate, in the HE-SIG-A, that there are two partitions of 20 MHz channels each. The processor(s) 200 may further indicate, by way of a first spatial index corresponding to the first MU partition, provided in the HE-SIG-B common part, that 4 streams within the first MU partition are allocated to a first allocation and 2 streams are allocated to a second allocation. The processor(s) 200, by way of a second spatial index provided in the HE-SIG-B common part, may indicate that all 8 streams within the second MU partition are a single partition. The processor(s) 200 still further may be configured to indicate an order of the STAs within the HE-SIG-B station specific part, such as by ordering the PAID of each of the three STAs. For example, the order indicated may be STA 1, STA 2, and then STA 3. In this case, STA 1 may be indicated to have assigned resources of the first MU partition and 4 streams, STA 2 may be indicated to have assigned the first MU partition and 2 streams, and STA 3 may be indicated to have the second MU partition and the 8 streams.

In some example embodiments, when operating in MU-MIMO mode, the AP may use a HE-SIG-B with only a STA specific part and no common part. In these cases, the processor(s) 200 may be configured to generate the HE-SIG-B such that each of the STA specific parts, corresponding to each of the STAs with which the AP is to communicate, may carry information including the identification of the corresponding STA, an index indicating a MU partition for that STA, and an index indicating a spatial partition for that STA. The data grouping of the STA identifier, allocated MU partition, and allocated stream(s) may be provided for each of the STAs to which the PPDU is to be sent by the AP.

The resource allocation module 218 may have instructions stored thereon that, when executed by the processor(s) 200, enable the AP 120 to provide a variety of RU allocation functionality. The processor(s) 200 may be configured to identify a RU allocation for each of the STAs 140 based on priority and/or expected data traffic associated with each of the STAs 140. The processor(s) 200 may further be configured to determine if the HE-SIG-B is to have a common part or only a STA specific part. When the HE-SIG-B is to provide an indication of a RU pattern and a RU allocation referenced to that RU pattern, then the HE-SIG-B may have both a common part and a STA specific part. The RU pattern may be indicated, such as by an RU pattern index, in the common part and the RU allocation index referenced to the RU pattern in the STA specific part.

It will be appreciated that there may be overlap in the functionality of the instructions stored in the operating systems (O/S) module 212, the applications module 214, the preamble module 216, and/or the resource allocation module 218. In fact, the functions of the aforementioned modules 212, 214, 216, 218 may interact and cooperate seamlessly under the framework of the AP 110. Indeed, each of the functions described for any of the modules 212, 214, 216, 218 may be stored in any module 212, 214, 216, 218 in accordance with certain embodiments of the disclosure. Further, in certain embodiments, there may be one single module that includes the instructions, programs, and/or applications described within the operating systems (O/S) module 212, the applications module 214, the preamble module 216, and/or the resource allocation module 218.

Figure 3:
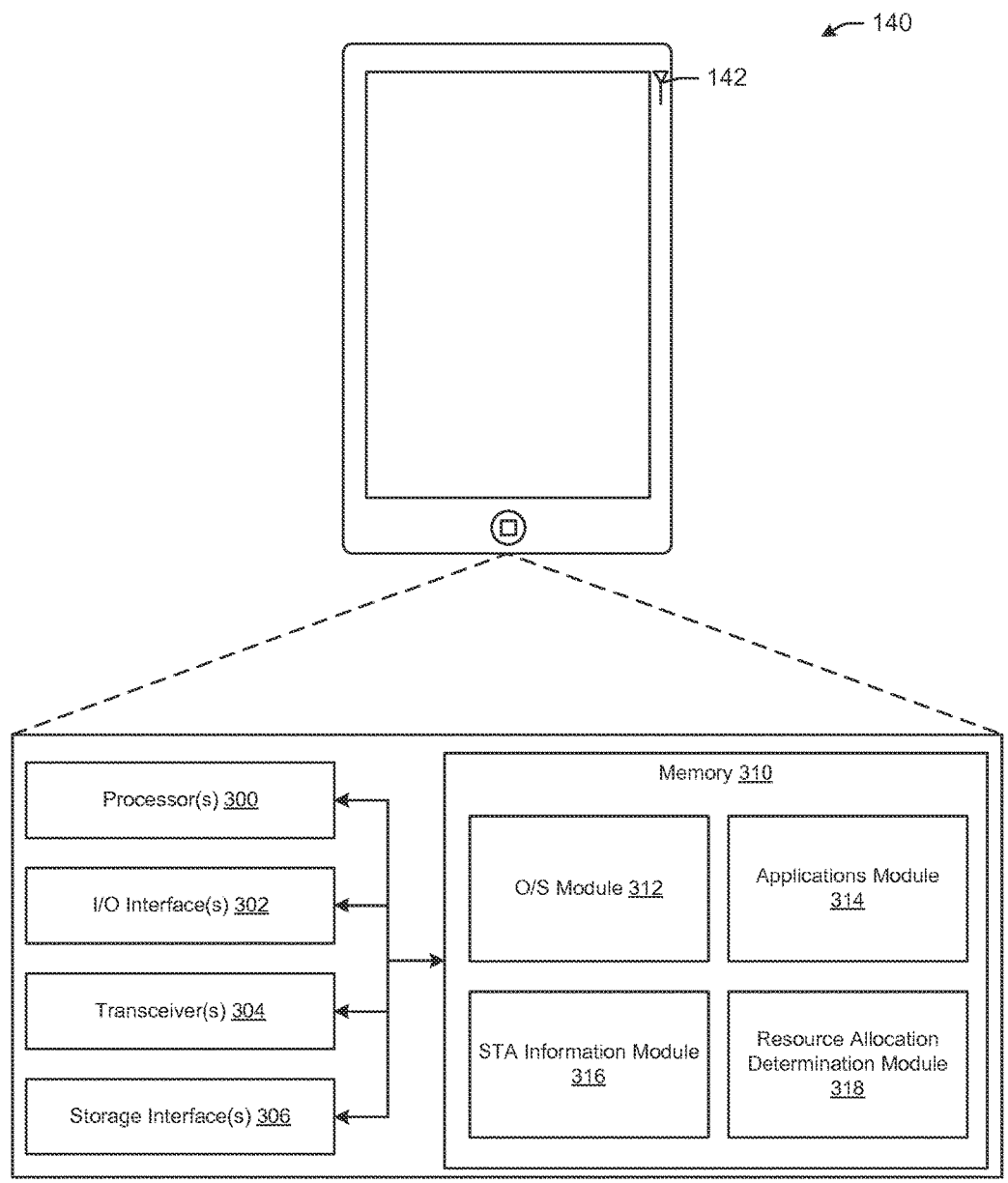
FIG. 3 depicts a simplified block diagram illustrating an example architecture of a user device (STA) of the environment of FIG. 1, in accordance with example embodiments of the disclosure.

FIG. 3 depicts a simplified block diagram illustrating an example architecture of a user device (STA) 140 of the environment 100 of FIG. 1, in accordance with example embodiments of the disclosure. The STA 140 may include one or more antennas 142. The STA 140 may further include one or more processor(s) 300, one or more I/O interface(s) 302, one or more transceiver(s) 304, one or more storage interface(s) 306, and one or more memory or storage 310. The descriptions of the one or more antennas 142, the one or more processor(s) 300, one or more I/O interface(s) 302, one or more transceiver(s) 304, one or more storage interface(s) 306, and one or more memory or storage 310 of the STA 140 of FIG. 3 may be substantially similar to the descriptions of the one or more antennas 112, the one or more processor(s) 200, one or more I/O interface(s) 202, one or more transceiver(s) 204, one or more storage interface(s) 206, and one or more memory or storage 210, respectively of the AP 120 of FIG. 2, and in the interest of brevity, will not be repeated here.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a STA information module 316, and a resource allocation determination module 318. Each of the modules and/or software may provide functionality for the STA 140, when executed by the processors 300. The modules and/or software may or may not correspond to physical locations and/or addresses in memory 310. In other words, the contents of each of the modules 312, 314, 316, 318 may not be segregated from each other and may, in fact be stored in at least partially interleaved positions on the memory 310. The descriptions of the O/S module 312 and the application(s) module 314 of the STA 140 of FIG. 3 may be substantially similar to the descriptions of the O/S module 212 and the application(s) module 214 of the AP 120 of FIG. 2 and in the interest of brevity, will not be repeated here.

The STA information module 316 may have instructions stored thereon that, when executed by the processor(s) 300, enable the STA 140 to provide a variety of Wi-Fi communications functionality. The processor(s) 300 may be configured to receive a PPDU and identify the preamble therefrom. This may involve a process of parsing the bits contained in the PPDU preamble. The processor(s) 300 may further be configured to identify a first part of the HEW preamble (e.g., HE-SIG-A) to decode a second part of the preamble (e.g., HE-SIG-B). The processor(s) 300 may still further be configured to use the information carried in the HE-SIG-A, such as MCS information and/or length information, to decode the HE-SIG-B.

The resource allocation determination module 318 may have instructions stored thereon that may be executed by the processors 300 to receive and analyze PPDUs from the AP 120 to identify a RU allocation. Once the HE-SIG-B is decoded, such as by the processes enabled by the STA information module 316, the processor(s) 300 may be configured to determine if the HE-SIG-B has a common part or only a STA specific part. If there is a common part, the processor(s) 300 may be configured to identify a RU pattern index from the common part. The processor(s) 300 may further be configured to access a mapping, such as a look-up table stored in memory 310, that maps the RU pattern to a grouping of RU allocation indices corresponding to particular RU blocks (e.g., defining the frequency range of the RU). At this point the RU allocation index allocated to the STA 140 may be determined from the STA specific part of the HE-SIG-B. In this case, the STA 140 may look for its PAID within the STA specific part of the HE-SIG-B to determine its corresponding RU allocation index, as referenced to the RU pattern indicated by the RU pattern index in the common part of the HE-SIG-B.

In other example embodiments, the processor(s) 300, by executing the instructions stored in the resource allocation determination module 318, may identify that the HE-SIG-B includes only a STA specific part. In this case, the processor(s) 300 may be configured to determine the channel bandwidth (e.g., 20 MHz, 40 MHz, 80 MHz, etc.) and identify a predetermined RU map associated with the channel bandwidth. The STA specific part will carry a RU allocation index that may be mapped to various RU blocks according to the predetermined RU map that corresponds to the channel bandwidth. By knowing the RU allocation index, the STA 140 may know the RU parameters (e.g., frequency start or center point and range).

In still further example embodiments, the processor(s) 300, by executing instructions stored in the resource allocation determination module 318, may further be configured to identify if MU-MIMO mode is to be used, based at least in part on information that may be contained in legacy fields and/or the HE-SIG-A fields of the preamble. The processor(s) 300 may still further be configured to determine the channel size and the MU partition scheme from information contained in the HE-SIG-A. In some example embodiments, the MU partition scheme information in the HE-SIG-A may occupy a location that may otherwise indicate the length of the HE-SIG-B and/or the HE-SIG-B common part. From the HE-SIG-B common part, the processor(s) 300 may be configured to identify spatial partitions corresponding to each of the MU partitions. From the HE-SIG-B STA specific parts, the processor(s) 300 may be configured to determine its own MU partition and streams based upon its order among all the STAs that are to be allocated resources.

In still further example embodiments, when operating in MU-MIMO mode with a HE-SIG-B with only a STA specific part (e.g., without a common part), the processor(s) 300 may be configured to identify its MU partition and spatial partition information from the STA specific part corresponding to itself. In these cases, the processor(s) 300 may identify its own PAID in the STA specific part and then identify a corresponding MU partition index and a corresponding spatial index. Based at least in part on the MU partition index and the spatial index, the processor(s) 300 may be configured to identify the resources it has available for the purposes of data transmission and reception.

It will be appreciated that there may be overlap in the functionality of the instructions stored in the operating systems (O/S) module 312, the applications module 314, the STA information module 316, and the resource allocation module 318. In fact, the functions of the aforementioned modules 312, 314, 316, 318 may interact and cooperate seamlessly under the framework of the STAs 140. Indeed, each of the functions described for any of the modules 312, 314, 316, 318 may be stored in any module 312, 314, 316, 318 in accordance with certain embodiments of the disclosure. Further, in certain embodiments, there may be one single module that includes the instructions, programs, and/or applications described within the operating systems (O/S) module 312, the applications module 314, the STA information module 316, and the resource allocation module 318.

Figure 4:
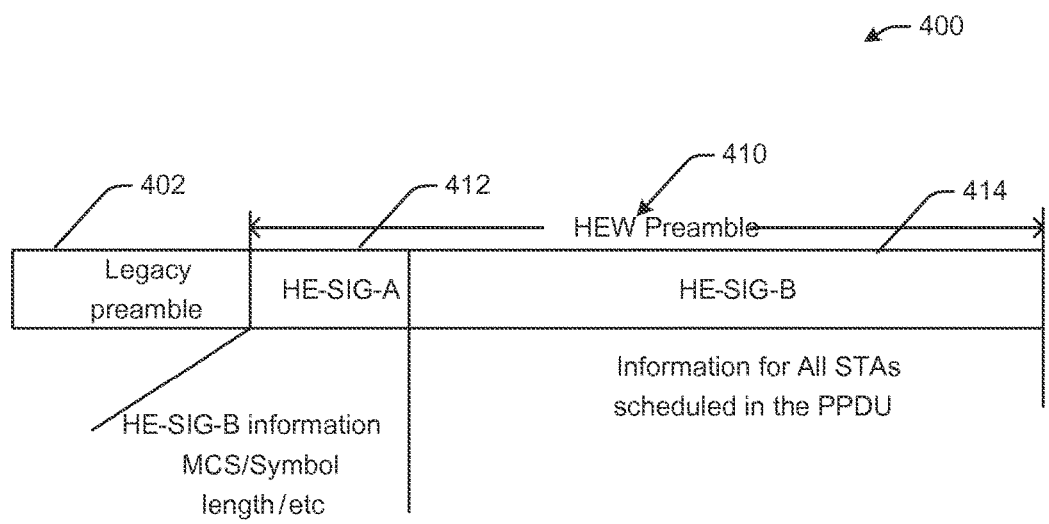
FIG. 4 depicts a datagram illustrating an example preamble of a physical layer convergence protocol (PLCP) protocol data unit (PPDU) used for allocating frequency resource units (RU) by the AP to the STA, in accordance with example embodiments of the disclosure.

FIG. 4 depicts a datagram illustrating an example preamble 400 of a physical layer convergence protocol (PLCP) protocol data unit (PPDU) used for allocating frequency resource units (RU) by the AP 110 to the STA 140, in accordance with example embodiments of the disclosure. The preamble 400 may include a legacy portion 402 and a high efficiency wireless local area network (HEW) portion 410. The HEW portion 410 may have two parts: HE-SIG-A 412 and HE-SIG-B 414. HE-SIG-A 412 may include common information shared by all of the scheduled STAs 140 and nearby unscheduled STAs 140. HE-SIG-B 414 may include information for scheduled STAs 140. HE-SIG-A 412 may include the information needed for decoding HE-SIG-B 414, such as MCS of HE-SIG-B 414, length of HE-SIG-B 414, and/or guard interval (GI) length of HE-SIG-B 414. The HE-SIG-B 414 may include information needed for decoding the data of all scheduled STAs 140. The preamble 400 may also include the legacy preamble portion (L-SIG) 402 to enable backward compatibility.

Figure 5:
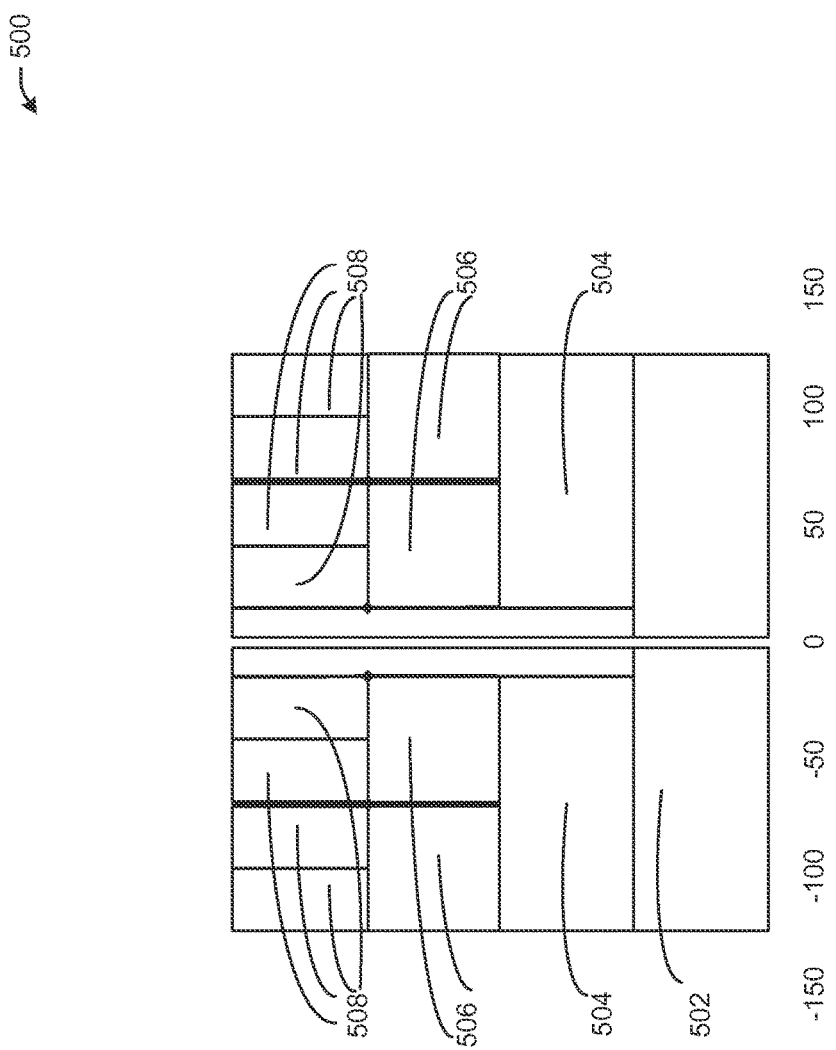
FIG. 5 depicts a datagram illustrating example RU allocation possibilities for a 20 MHz channel, in accordance with example embodiments of the disclosure.
Figure 6:
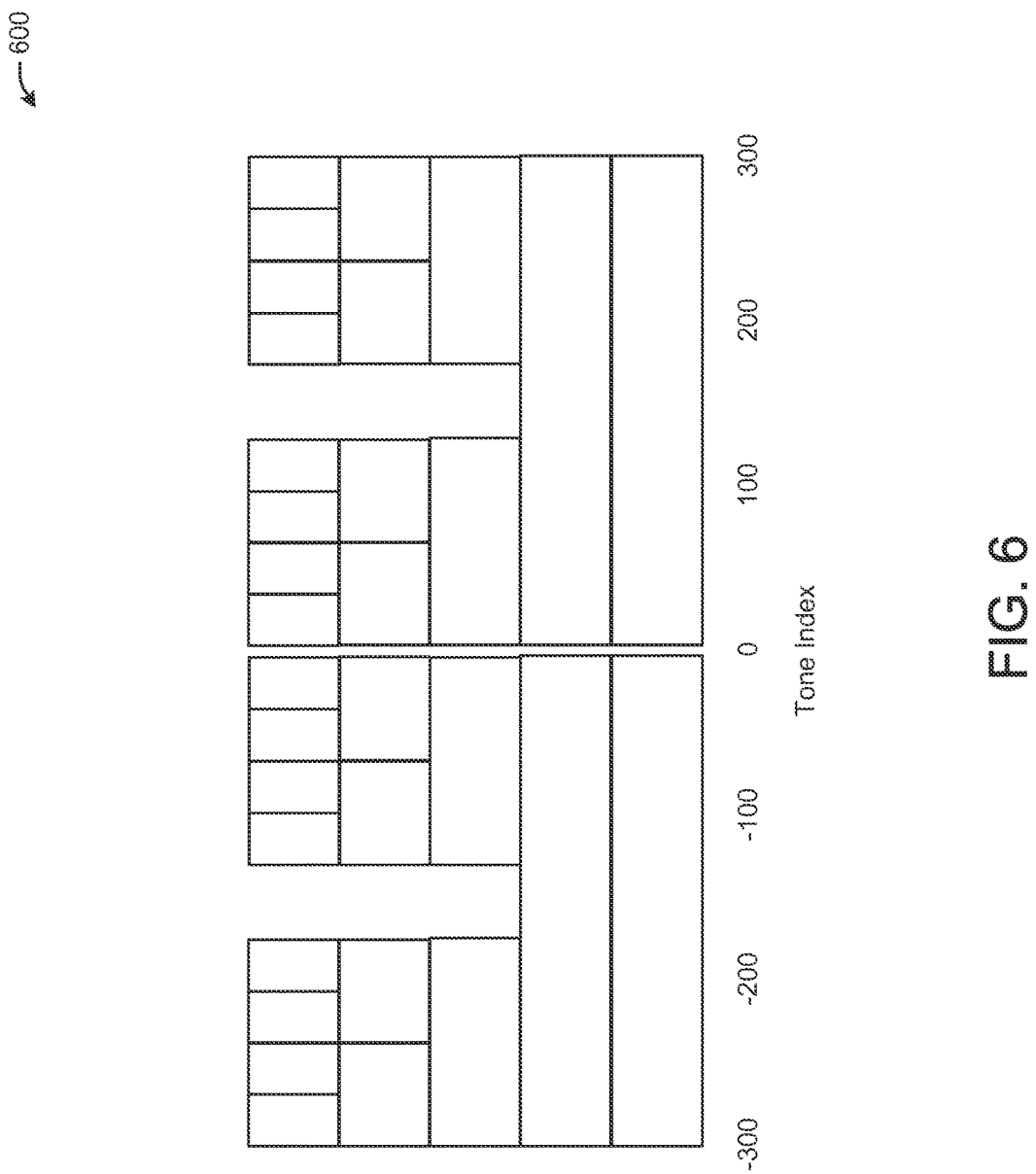
FIG. 6 depicts a datagram illustrating example RU allocation possibilities for a 40 MHz channel, in accordance with example embodiments of the disclosure.
Figure 7:
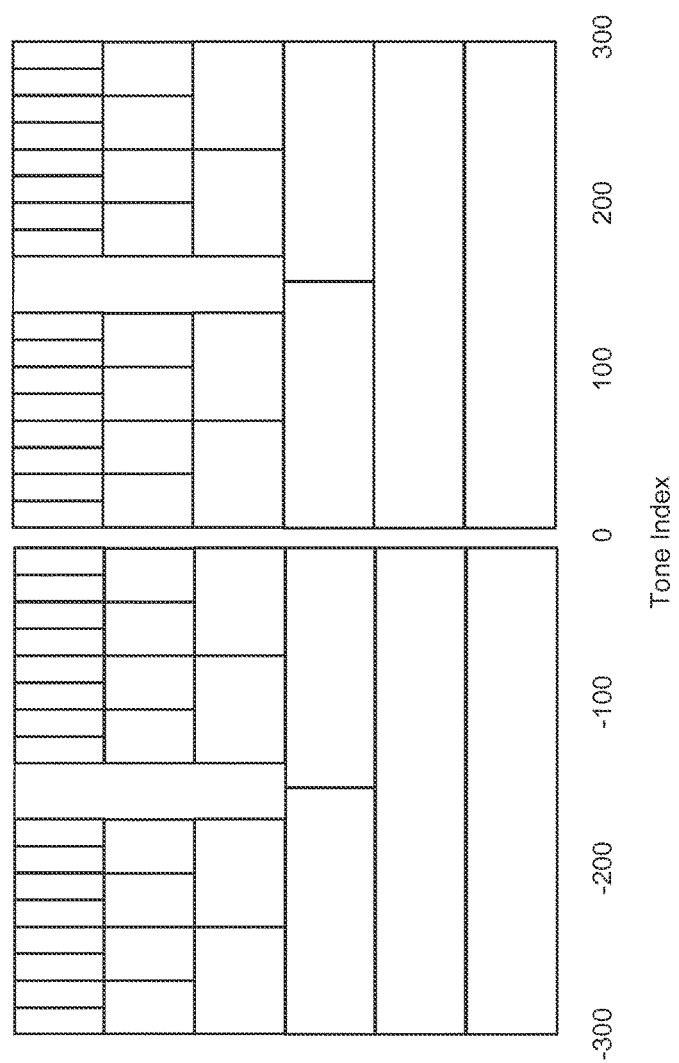
FIG. 7 depicts a datagram illustrating example RU allocation possibilities for a 80 MHz channel, in accordance with example embodiments of the disclosure.

FIG. 5 depicts a datagram illustrating example RU allocation possibilities 500 for a 20 MHz channel, in accordance with example embodiments of the disclosure. FIG. 6 depicts a datagram illustrating example RU allocation possibilities 600 for a 40 MHz channel, in accordance with example embodiments of the disclosure. FIG. 7 depicts a datagram illustrating example RU allocation possibilities 700 for a 80 MHz channel, in accordance with example embodiments of the disclosure. The possible RU locations are illustrated in FIGS. 5, 6, and 7 with 20 MHz, 40 MHz, and 80 MHz channels, respectively. For the purposes of illustration, various RU spectral blocks are labeled in FIG. 5 for the 20 MHz case. For example, a single 20 MHz (e.g., 242 tone) block 502 may be allocated. Alternatively, 10 MHz blocks 504, 5 MHz blocks 506, 2.5 MHz blocks 508, or a combination thereof, may be allocated. The locations of all RUs may be fixed in frequency domain. For example, all feasible locations of 26-tone RU are shown in FIGS. 5, 6, and 7. Additionally, in example embodiments, the 26-tone RU may not cross 242-tone RU boundaries. Further still, in example embodiments, a bigger RU (e.g., frequency range) in FIGS. 5, 6, and 7 can be replaced by smaller RUs. The possible locations of the smaller RUs are specified. These constraints on the RUs may be used to map the RUs according to a mapped RU pattern with an index ascribed to each RU. The RU index may be used to reference the RU in the HE-SIG-B 414. Therefore, these newly posed constraints can be exploited for highly simplifying the signaling of the resource allocation for orthogonal frequency division multiple access (OFDMA) mode.

The mapped and indexed references to the RUs may be more efficient (e.g. require fewer bits) to communicate the RU allocation to the individual STAs 140 than frequency resource allocation using bit maps. For example, each minimum RU (e.g., 26 tone RU) may be assigned an indication bit. The indication bits jointly specify how the whole frequency band is partitioned. For 20 MHz channel, 8-9 indication bits may be used, and because of the newly posed constraints, the HE-SIG design may be simplified and/or made more efficient.

Instead of bit map, one may index each allocation pattern. There are only 26 feasible allocation patterns for 20 MHz and 5 bits instead of 9 bits may be enough to uniquely map each of the allocation patterns. The allocation pattern is especially suitable for jointly indicating the frequency allocation for all scheduled STAs 140. This joint indication may be placed in HE-SIG-A or a common part in HE-SIG-B. The RU pattern may be accessible by all of the STAs 140 and individual STA 140 RU allocation indexes may be referenced to the allocation map of the RU pattern (e.g., one of the 26 feasible allocation patterns).

Figure 8:
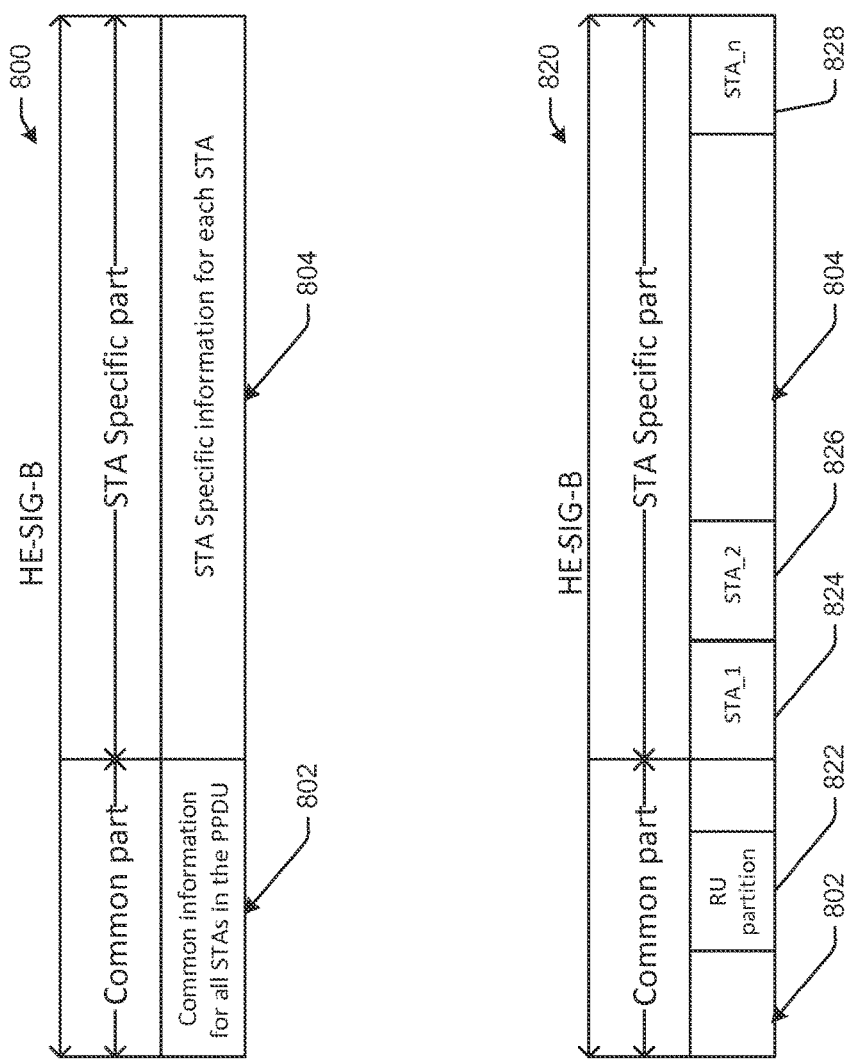
FIG. 8 depicts a datagram illustrating example HE-SIG-B portion of the example preamble of FIG. 3 with a common part and a STA specific part, in accordance with example embodiments of the disclosure.

FIG. 8 depicts a datagram illustrating example HE-SIG-B 800 portion of the example preamble of FIG. 3 with a common part 802 and a STA specific part 804, in accordance with example embodiments of the disclosure. The OFDMA mode may need to be signaled to the receiver STA 140. Indication bits can be used in HE-SIG-A (e.g., placed prior to the HE-SIG-B to indicate the OFDMA mode). In addition, the legacy preamble (L-SIG) may be repeated in time domain. The repeated legacy preamble may carry 1-4 bits of additional information using BPSK modulation on the L-SIG data sequence. In example embodiments, the length field in the L-SIG may also carry 1 additional bit. Indication bits may be allocated in any or all of the three parts (e.g., L-SIG, HE-SIG-A, or HE-SIG-B). There may be three basic modes: single user, OFDMA, and multiuser MIMO. There may be eight combinations of these modes. The implementation may be configured to support all of these combinations. For simplicity, IEEE 802.11ax may or may not support all combinations of the three modes. Namely, only the three basic modes may be supported. Alternatively, in example embodiments, the three basic modes may only share the band in 20 MHz granularity. For example, in a 80 MHz band, there are four 20 MHz subchannels. Each basic mode can be provided on one or multiple subchannels. However, within each subchannel, the mixing of basic modes may not be supported. 4-8 bits may be needed for 80 MHz channel for allocating the 20 MHz subchannels to the basic modes.

The indication bits may indicate at least one of the following for the receiver to decode HE-SIG-B, which may or may not contain a common part and contain one or multiple STA specific parts: (i) the length of the common part in HE-SIG-B if there is a common part in HE-SIG-B; (ii) the length of each STA specific part if there is no common part in HE-SIG-B; (iii) the basic mode or modes used in the data portion after the HEW-preamble. The length of each STA specific part (e.g., with STA specific information 824, 826, 828) may be defined to be the same for all three basic modes. However, this may not be efficient, since the STA specific part for MU-MIMO usually consumes more bits than the other two modes. Therefore, if there is no common part in HE-SIG-B, the indication bits may specify one basic mode such that the receiver (e.g., STA 140) knows the corresponding length of each STA specific part for decoding HE-SIG-B. The HE-SIG-B, in example embodiments, may include STA specific information for each of the STAs 140 in the PPDU. The HE-SIG-B may further include common information 822 shared by all of the STAs 140 in the PPDU.

The common information may be used to indicate the signaling addressed to all of the scheduled STAs 140. The STA specific information may be used to indicate the signaling addressed to each individual STA. If the common information is in presence, these bits may be individually encoded (e.g., by channel coding). That means the common information may be decoded before the STA specific information such that the length of each STA specific part can be known.

Before the HE-SIG-B, there should be indication bits to indicate whether OFDMA or Multi-User MIMO (MU-MIMO) transmission is used in the current PPDU. This signaling could be included in the HE-SIG-A and/or before the HE-SIG-A. If it is before HE-SIGA, it may be piggybacked in the repeated L-SIG. The resource unit (RU) allocation or bandwidth allocation may be signaled by indicating a RU allocation pattern in the common part of HE-SIG-B, in some example embodiments, or by indicating RU allocation in the STA specific part of HE-SIG-B, in other example embodiments.

Each allocation pattern may be one partitioning of the whole band (e.g. 80 MHz or a subchannel 20 MHz). Defining allocation patterns helps to reduce signaling overhead of bandwidth allocation. All scheduled STAs 140 allocated bandwidths may be jointly specified by the indexed pattern. No individual specification for each STA's RU location and size is needed in these example embodiments. RU allocation pattern may be specified in the common part of HE-SIG-B or, alternatively, HE-SIG-A.

Using the possible RU locations for 20 MHz, we have Table 1 which includes all of the allocation patterns for 20 MHz. There are 26 unique patterns, which can be indicated (e.g., referenced) by 5 bits. Each of these RU patterns (e.g., 26 of them) may be referenced in HE-SIG-B common part or, alternatively the HE-SIG-A, using a 5 bit RU pattern index for a 20 MHz channel. Each pattern, in these example embodiments, may be a distinct partitioning of the 20 MHz channel using the defined RU sizes such as 26, 52, 242 tones. It will be appreciated that according to example embodiments, other RU sizes (e.g. 116 tones) may be used in RU allocation blocks.

TABLE 1

| RU allocation patterns for 20 MHz | |
| --- | --- |
| Number of RUs in each pattern | Number of patterns |
| 1 | 1 |
| 3 | 1 |
| 4 | 2 |
| 5 | 5 |
| 6 | 6 |
| 7 | 6 |
| 8 | 4 |
| 9 | 1 |

Note that possible RU locations in a 40 MHz OFDMA PPDU may be equivalent to two replicas of the possible RU locations in a 20 MHz OFDMA PPDU plus a single pattern with a 484 tone RU. This means that 10 bits may be used for 40 MHz RU location indication. Note that possible RU locations in an 80 MHz OFDMA PPDU is equivalent to two replicas of the possible RU locations in a 40 MHz OFDMA PPDU plus a single pattern with a 996 tone RU. This means 20 bits may be used for 80 MHz RU location indication.

Figure 9:
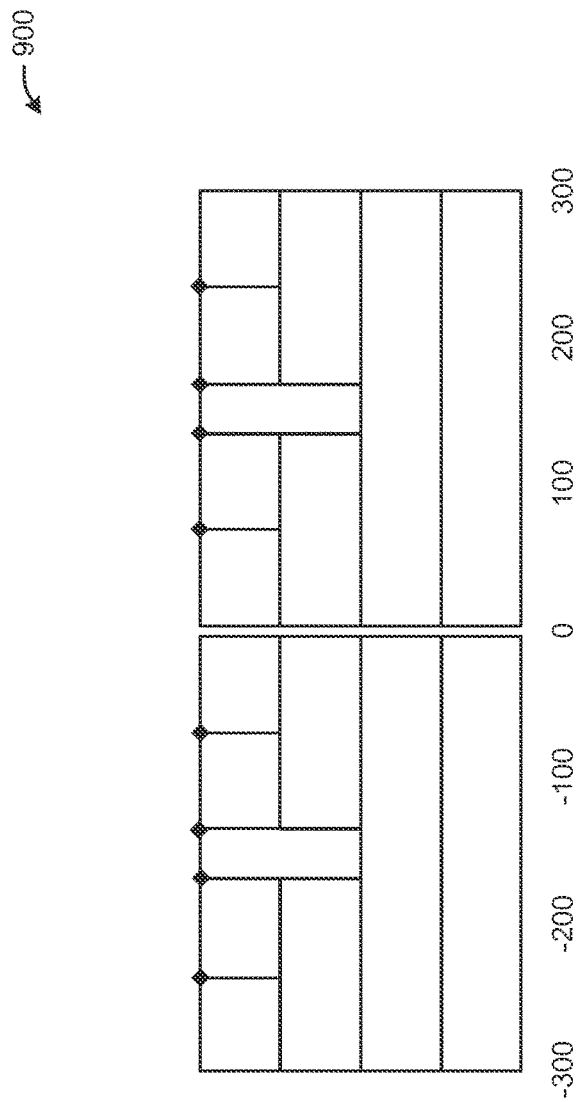
FIG. 9 depicts a datagram illustrating an example RU allocation pattern for the 40 MHz channel, in accordance with example embodiments of the disclosure.

Note that for 80 MHz, if the number of scheduled STAs is limited, e.g. to 16 or the number of 26 tone RUs is limited, the number of allocation patterns may be further reduced. For instance, if we combine some of the 26 tone RUs in 40 MHz, we may get the possible RU locations as FIG. 9. FIG. 9 depicts a datagram illustrating an example RU allocation pattern 900 for the 40 MHz channel, in accordance with example embodiments of the disclosure. Table 2 shows all of the possible allocation patterns for the simplified 40 MHz. That means that 10 bits may be used to index all of the possible RU allocation patterns for 80 MHz.

TABLE 1

| RU partitions for simplified 40 MHz | |
| --- | --- |
| Number of RUs in each pattern | Number of patterns |
| 1 | 1 |
| 2 | 1 |
| 4 | 2 |
| 5 | 4 |
| 6 | 3 |
| 7 | 4 |
| 8 | 6 |
| 9 | 4 |
| 10 | 1 |

Figure 10:
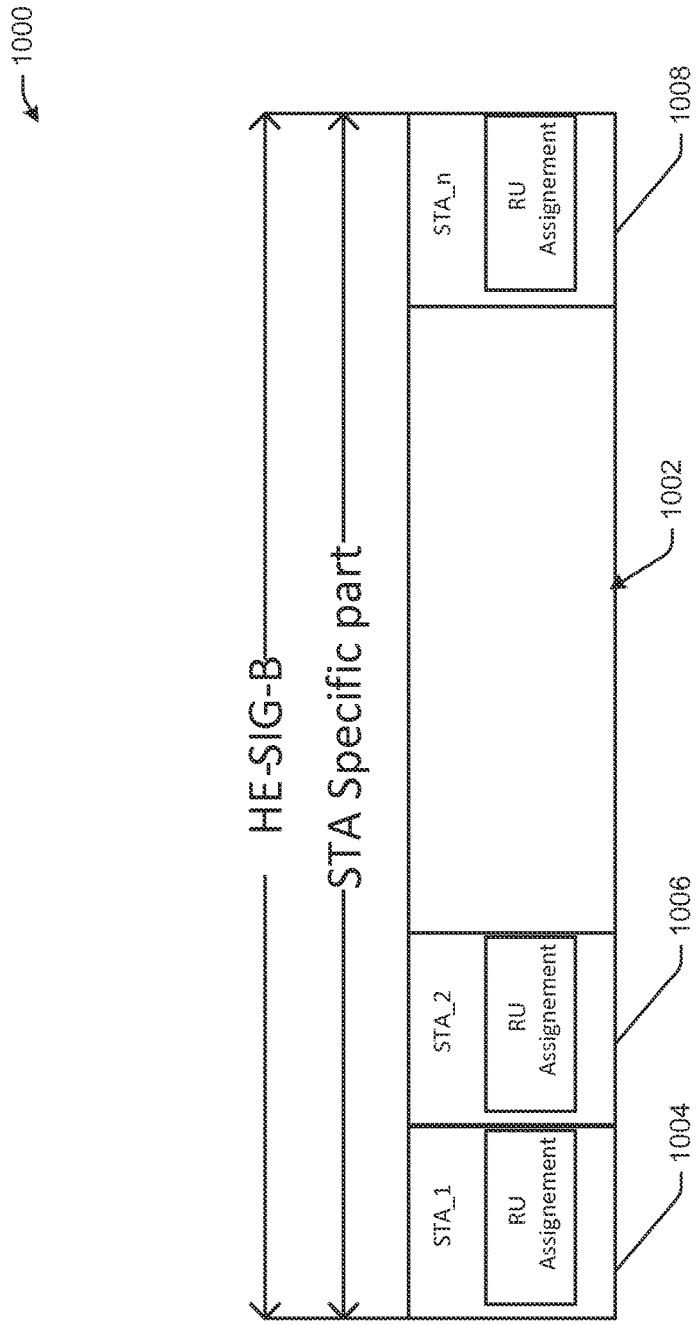
FIG. 10 depicts a datagram illustrating an example HE-SIG-B portion with only a STA specific part, in accordance with example embodiments of the disclosure.

FIG. 10 depicts a datagram illustrating an example HE-SIG-B portion 1000 with only a STA specific part 1002, in accordance with example embodiments of the disclosure. Since the allocation pattern is to be decoded by all scheduled STAs 140, it needs to be put in the common part of HE-SIG-B or HE-SIG-A. If the common part is not defined in HE-SIG-B or there is no space in HE-SIG-A for the pattern index, then the bandwidth allocation information needs to be distributed in each scheduled STA's specific part. The STA specific part 1002 may include information sections 1004, 1006, 1008 corresponding to each of the STAs 140 to which RU allocations are to be made. In these example embodiments, each of the sections may include a PAID of the corresponding STA 140 and an RU allocation index for that STA 140.

Figure 11:
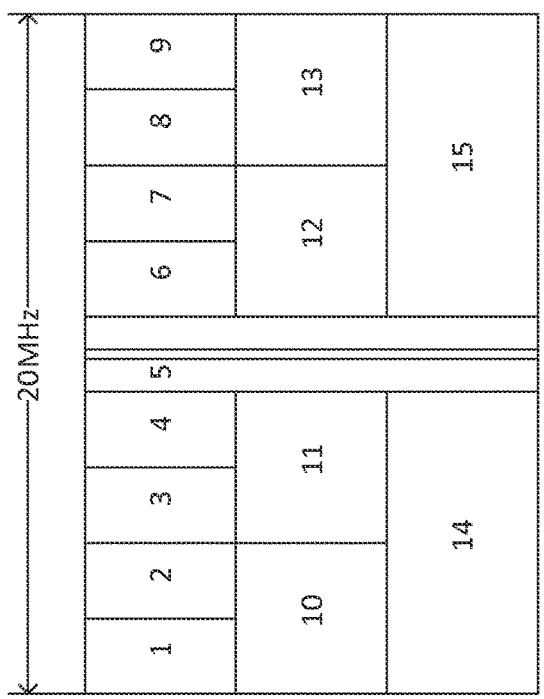
FIG. 11 depicts a datagram illustrating an example RU allocation pattern for the 20 MHz channel, in accordance with example embodiments of the disclosure.

FIG. 11 depicts a datagram illustrating an example RU allocation pattern for the 20 MHz channel, in accordance with example embodiments of the disclosure. For a given bandwidth, if we assign one index to each of the possible RU locations in FIG. 6, the possible RU locations may be indexed by 4 bits, 5 bits, or 7 bits for 20 MHz channel, 40 MHz channel, 80 MHz channel, respectively. According to example embodiments, the RU allocation information may not be needed in the common information part. Instead, the AP 110 may put the RU location index of each STA 140 in the STA's specific information 1004, 1006, 1008 in HE-SIG-B 1000 as shown in FIG. 10. In example embodiments, the RU allocation index for a 20 MHz channel may correspond to the indices 1-15 as depicted as RU blocks in the RU pattern 1110 of FIG. 11. The RU location index may indicate both the location of the RU and also the size of the RU. In example embodiments, there may be any suitable number of the RU indexes corresponding to any suitable number of channel partitions.

Figure 12:
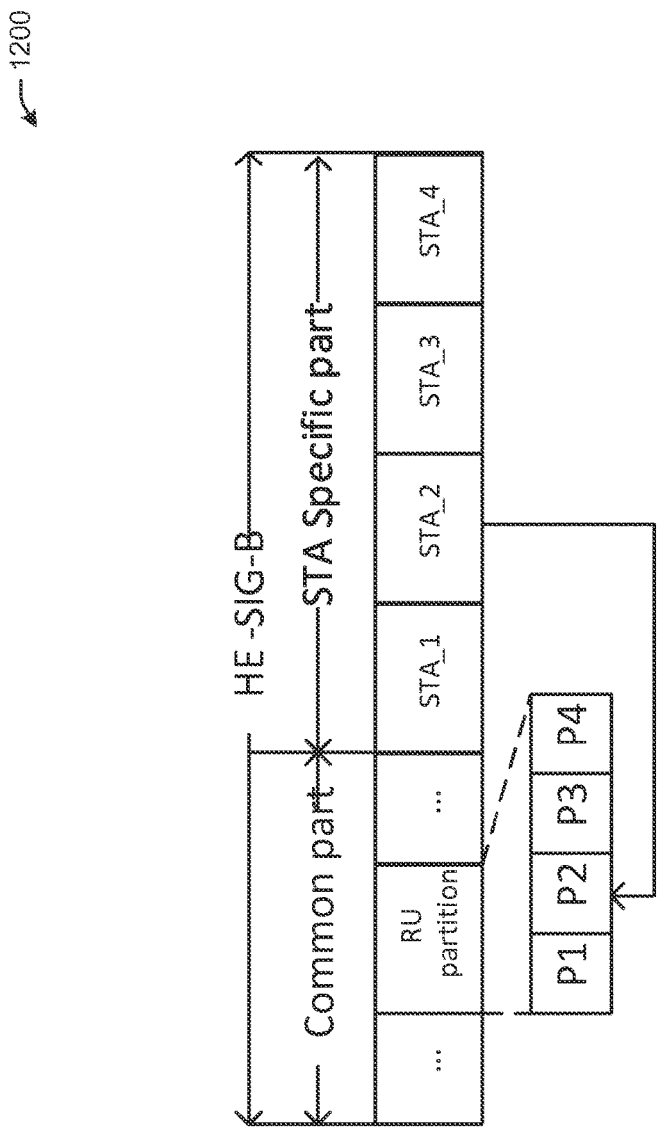
FIG. 12 depicts a datagram illustrating an example HE-SIG-B portion indicating a sequence of RU allocation information, in accordance with example embodiments of the disclosure.

FIG. 12 depicts a datagram illustrating an example HE-SIG-B portion 1200 indicating a sequence of RU allocation information, in accordance with example embodiments of the disclosure. After reading the RU partition information (e.g., the allocation pattern in the common part of HE-SIG-B), in embodiments where there is such a field, each STA 140 may know the band partition in the current PPDU. If one STA wants to further derive its RU assignment, there are two alternatives: (i) sequentially assign the RUs to the STAs listed in the STA specific part of HE-SIG-B; or (ii) explicitly indicate the non-allocated RU in the common part of the HE-SIG-B.

As an example in FIG. 12, if there are 4 RUs in the current PPDU, it may indicate that there are no more than 4 STAs in the current PPDU. One STA may determine its HE-SIG-B portion by checking the partial access ID (PAID) in the STA specific part of HE-SIG-B. If the STA finds its PAID in the 1st position of the STA specific part of HE-SIG-B, then it may indicate that the 1st RU is for the STA with its PAID in the first portion of the STA specific portion. If the STA 140 finds its PAID in the 2nd position of STA specific part of HE-SIG-B, it means the 2nd RU is for this STA 140. In this way, each of the STAs 140 may know its RU allocation.

Figure 13:
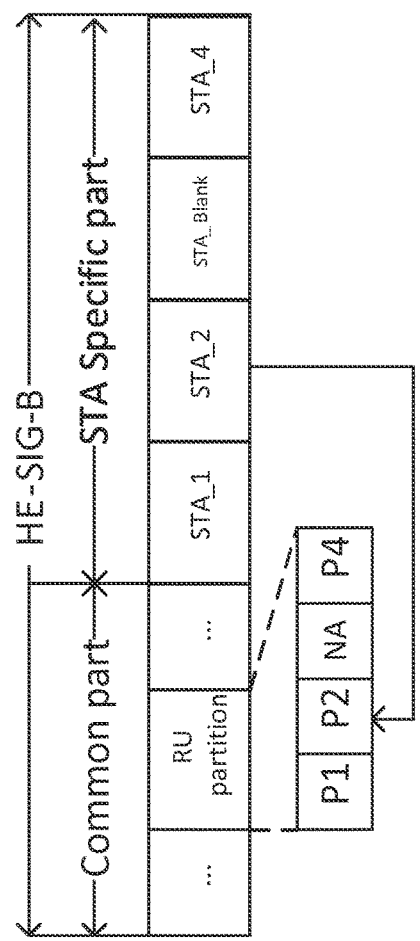
FIG. 13 depicts a datagram illustrating an example HE-SIG-B portion indicating a sequence of RU allocation information with an unallocated RU, in accordance with example embodiments of the disclosure.

If one RU is not allocated or is skipped, AP 110 may assign a special (e.g., blank or null) PAID which is not decodable by or known to any of the scheduled STA. As a result, all of the STAs 140 will skip that RU. FIG. 13 depicts a datagram illustrating an example HE-SIG-B 1300 portion indicating a sequence of RU allocation information with an unallocated RU, in accordance with example embodiments of the disclosure.

Figure 14:
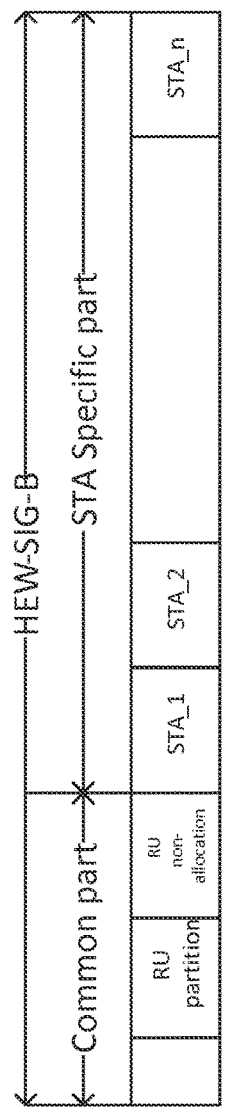
FIG. 14 depicts a datagram illustrating another example HE-SIG-B portion indicating a sequence of RU allocation information with an unallocated RU, in accordance with example embodiments of the disclosure.

Explicit indication of the non-allocated RU in the common part of HE-SIG-B may be understood with reference to FIG. 14. FIG. 14 depicts a datagram illustrating another example HE-SIG-B portion 1400 indicating a sequence of RU allocation information with an unallocated RU, in accordance with example embodiments of the disclosure. After the RU allocation information (e.g. the allocation pattern in the common part of HE-SIG-B), there may be RU non-allocation information. This non-allocation information may indicate the non-allocated RUs. The non-allocation may be realized by bit map. If there are M RU partitions in the current PPDU, M bits may be used to indicate which RU is non-allocated. In other example embodiments, the possible non-allocated RU to be the same as the possible RU locations. With this constraint, the non-allocated RU may be indexed in the same way as in FIG. 11 for the 20 MHz channel. It may be easily extended to 40 MHz and/or 80 MHz channels as well. Then 4/5/7 bits can be used for 20/40/80 MHz to indicate the non-allocated RU location. After the STA 140 knows the RU allocation pattern and non-allocated RUs, the STA 140 may remove the non-allocated RUs from the allocation pattern and use its STA position in the STA list in the STA specific part to derive the RU assignment for itself.

Figure 15:
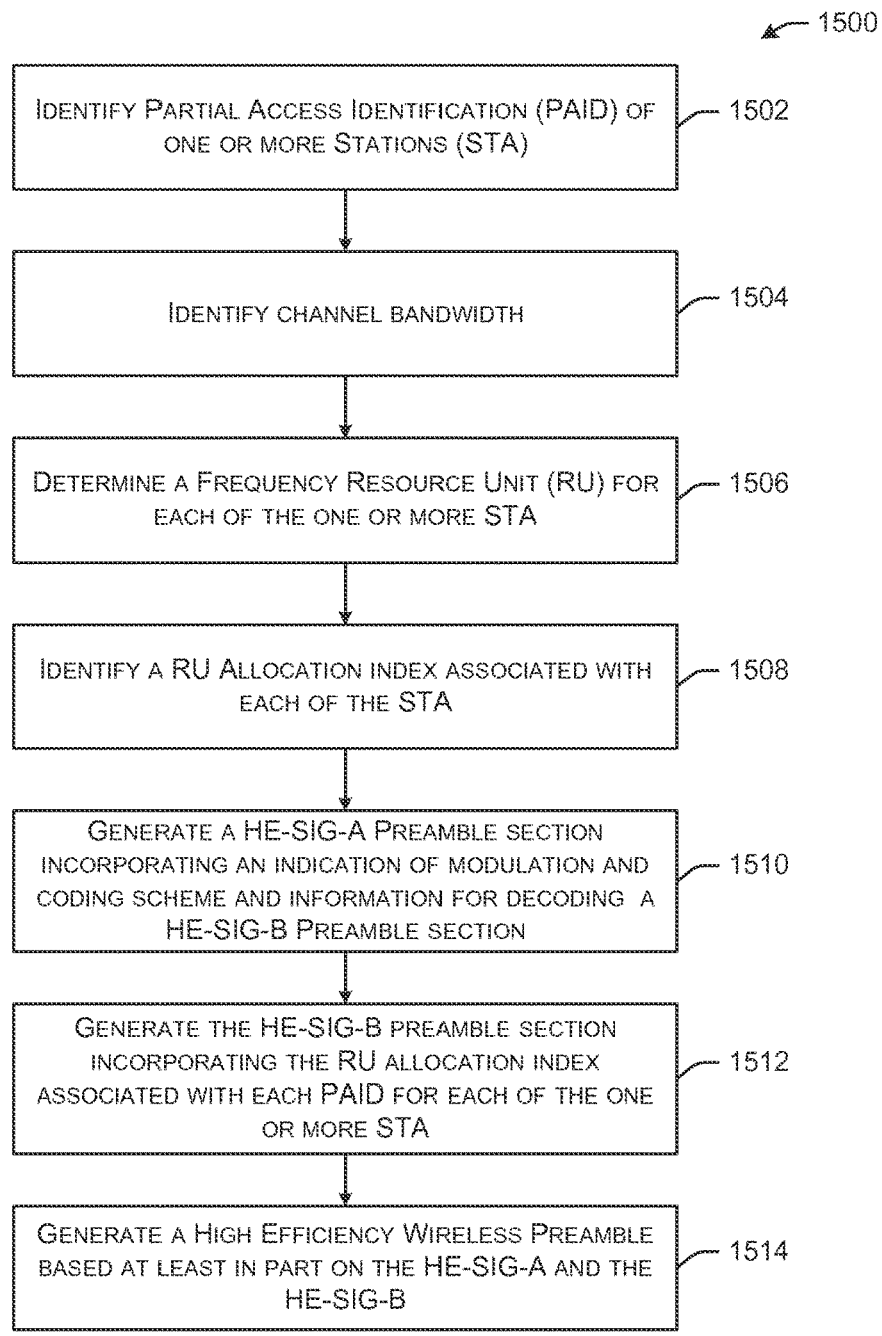
FIG. 15 depicts a flow diagram illustrating an example method for generating a high efficiency wireless preamble with a HE-SIG-B portion with only a STA specific part of FIG. 10 indicating an allocation of RUs to respective STAs, in accordance with example embodiments of the disclosure.

FIG. 15 depicts a flow diagram illustrating an example method 1500 for generating a high efficiency wireless preamble with a HE-SIG-B portion with only a STA specific part of FIG. 10 indicating an allocation of RUs to respective STAs, in accordance with example embodiments of the disclosure. This method 1500, in example embodiments, may be performed by the AP 110 and the processor(s) 200 thereon. At block 1502, a partial access identification (PAID) of one or more STAs may be identified. In example embodiments, the PAID may be assigned to the STA 140 by the AP 110 during pre-RU assignment procedures, such as handshaking procedures.

At block 1504, a channel bandwidth may be identified. Based at least in part upon the channel bandwidth, the processor(s) 200 may be aware of the possible RUs and a respective index associated with each of the RUs. At block 1506, RUs associated with each of the one or more STAs may be determined. This determination may be based on a stored RU allocation pattern map stored in the memory 210 of the AP 110. At block 1508, a RU allocation index associated with each of the one or more STAs may be identified. The AP 110 may assign the RUs based on priority, requests, pre-defined schedules, randomly, and/or anticipated data needs. At block 1510, a HE-SIG-A preamble section incorporating an indication of MCS and information for decoding the HE-SIG-B preamble section may be generated. At block 1512, the HE-SIG-B preamble section incorporating the RU allocation index associated with each PAID for each of the one or more STA may be generated. At block 1514, a HEW preamble may be generated based at least in part on the HE-SIG-A and the HE-SIG-B.

It should be noted, that the method 1500 may be modified in various ways in accordance with certain embodiments of the disclosure. For example, one or more operations of method 1500 may be eliminated or executed out of order in other embodiments of the disclosure. Additionally, other operations may be added to method 1500 in accordance with other embodiments of the disclosure.

Figure 16:
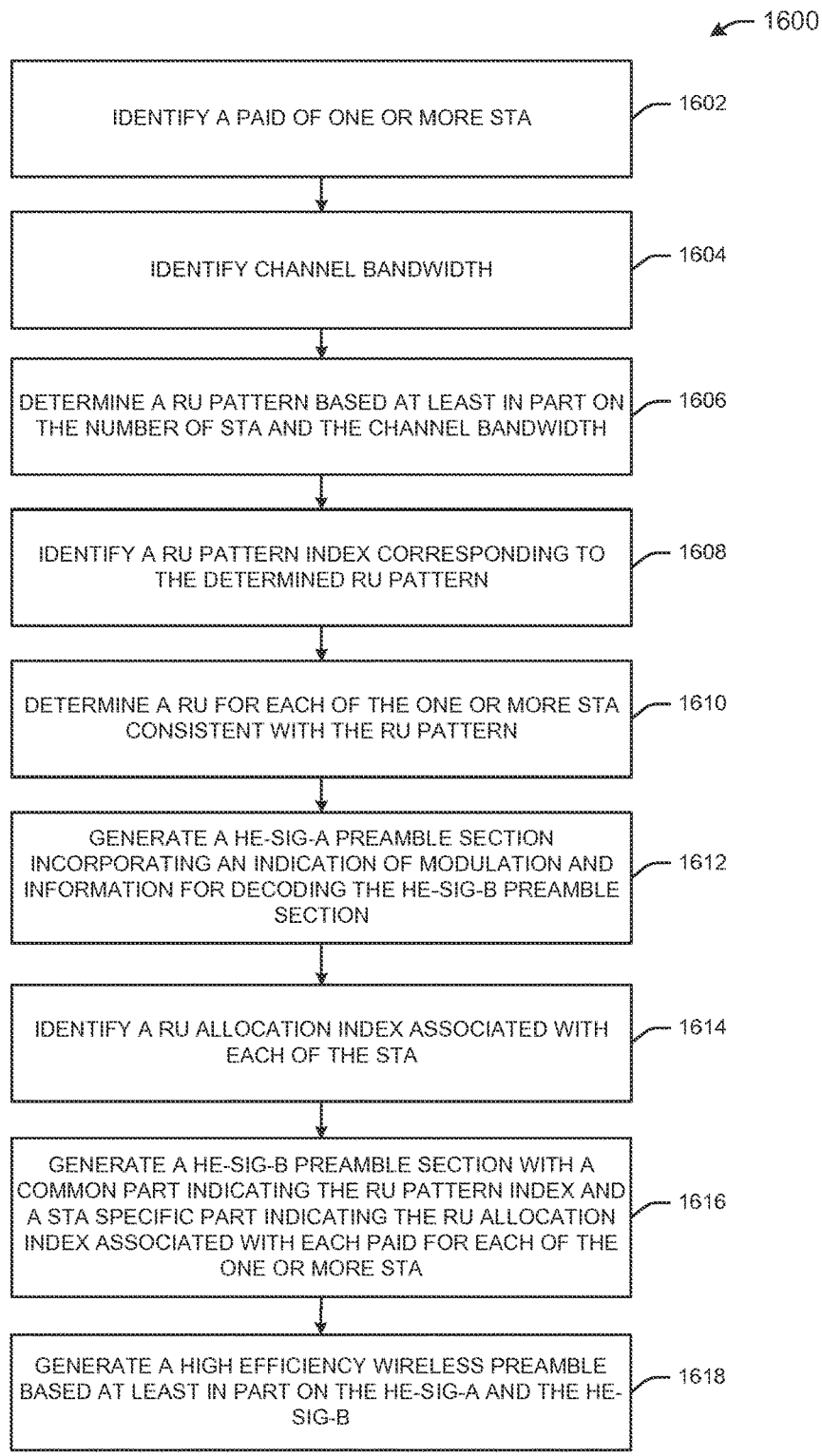
FIG. 16 depicts a flow diagram illustrating an example method for generating a high efficiency wireless preamble with a HE-SIG-B portion with a common part and a STA specific part of any of FIG. 12, 13, or 14 indicating an allocation of RUs to respective STAs, in accordance with example embodiments of the disclosure.

FIG. 16 depicts a flow diagram illustrating an example method 1600 for generating a high efficiency wireless preamble with a HE-SIG-B portion with a common part and a STA specific part of any of FIG. 12, 13, or 14 indicating an allocation of RUs to respective STAs, in accordance with example embodiments of the disclosure. This method 1600, in example embodiments, may be performed by the AP 110 and the processor(s) 200 thereon. At block 1602, a PAID of one or more STAs may be identified. At block 1604, a channel bandwidth may be identified. For example the bandwidth may be 20 MHz, 40 MHz, or 80 MHz, as depicted in FIGS. 5, 6, and 7, respectively.

At block 1606, a RU pattern may be determined based at least in part on the number of STA and the channel bandwidth. For example, as depicted above, there may be 26 unique RU patterns associated with a 20 MHz channel. One of these unique patterns may be selected to satisfy the bandwidth needs of the STAs 140 to which RU allocations are to be made. At block 1608, a RU pattern index corresponding to the determined RU pattern may be identified. This may be performed by consulting a look-up table or other form of RU block mapping to indices, that may be stored in the memory 210 or elsewhere. At block 1610, a RU for each of the one or more STAs consistent with the RU pattern may be determined. At block 1612, a HE-SIG-A preamble section may be generated by incorporating an indication of MCS and information for decoding the HE-SIG-B preamble section. At block 1614, a RU allocation index associated with each of the STA may be identified.

At block 1616, the HE-SIG-B preamble section with a common part indicating the RU pattern index and a STA specific part indicating the RU allocation index associated with each of the PAID of each of the one or more STAs may be generated. At block 1618, a HEW preamble may be generated based at least in part on the HE-SIG-A and the HE-SIG-B.

It should be noted, that the method 1600 may be modified in various ways in accordance with certain embodiments of the disclosure. For example, one or more operations of method 1600 may be eliminated or executed out of order in other embodiments of the disclosure. Additionally, other operations may be added to method 1600 in accordance with other embodiments of the disclosure.

Figure 17:
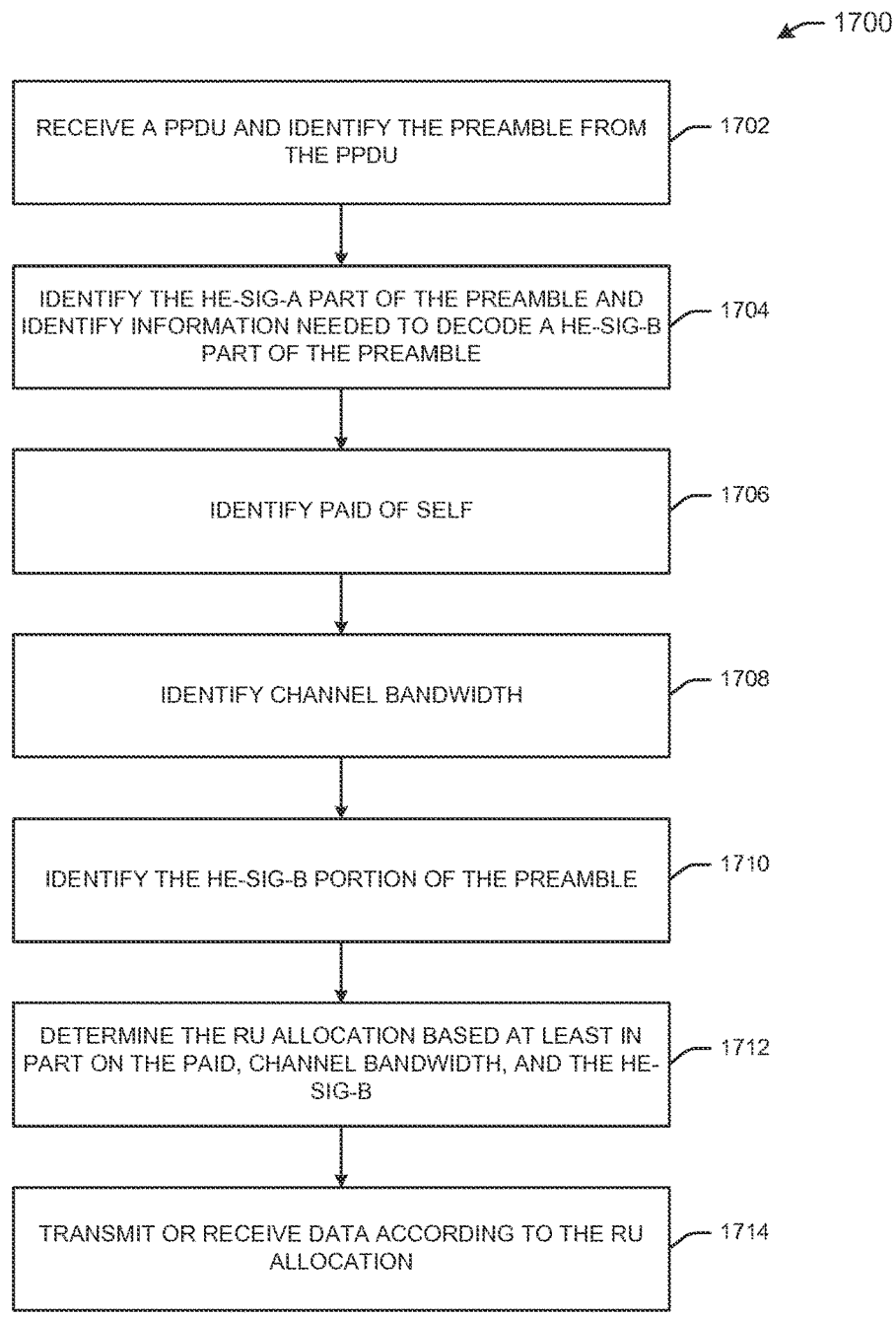
FIG. 17 depicts a flow diagram illustrating an example method for identifying an RU for transmitting and receiving data based at least in part on a received PPDU, in accordance with example embodiments of the disclosure.

FIG. 17 depicts a flow diagram illustrating an example method 1700 for identifying an RU for transmitting and receiving data based at least in part on a received PPDU, in accordance with example embodiments of the disclosure. This method 1700, in example embodiments, may be performed by the STAs 140 and the processor(s) 310 thereon. At block 1702, a PPDU may be received and the preamble of the PPDU may be identified. At block 1704, the HE-SIG-A part of the preamble may be identified and the information needed to decode the HE-SIG-B part of the preamble may be identified.

At block 1706, the PAID of the STA may be determined. In other words, the PAID of the user device 120 performing this method 1700 may be identified. This information may have been earlier received by the STA 140 from the AP 110, such as during a handshaking process or otherwise a process by which the AP identified the STAs with which it is to connect and/or communicate. At block 1708, the channel bandwidth may be identified. In some example embodiments, this the channel bandwidth may be one of 20 MHz, 40 MHz, or 80 MHz. In example embodiments, the channel bandwidth may be communicated to the STA 140 by the AP 110, such as on the PPDU transmitted by the AP 110 and received by the STA 140.

At block 1710, the HE-SIG-B portion of the preamble may be identified. At block 1712, the RU allocation may be determined based at least in part on the PAID, channel bandwidth, and the HE-SIG-B. At block 1714, data may be transmitted and/or received according to the RU allocation.

It should be noted, that the method 1700 may be modified in various ways in accordance with certain embodiments of the disclosure. For example, one or more operations of method 1700 may be eliminated or executed out of order in other embodiments of the disclosure. Additionally, other operations may be added to method 1700 in accordance with other embodiments of the disclosure.

Figure 18:
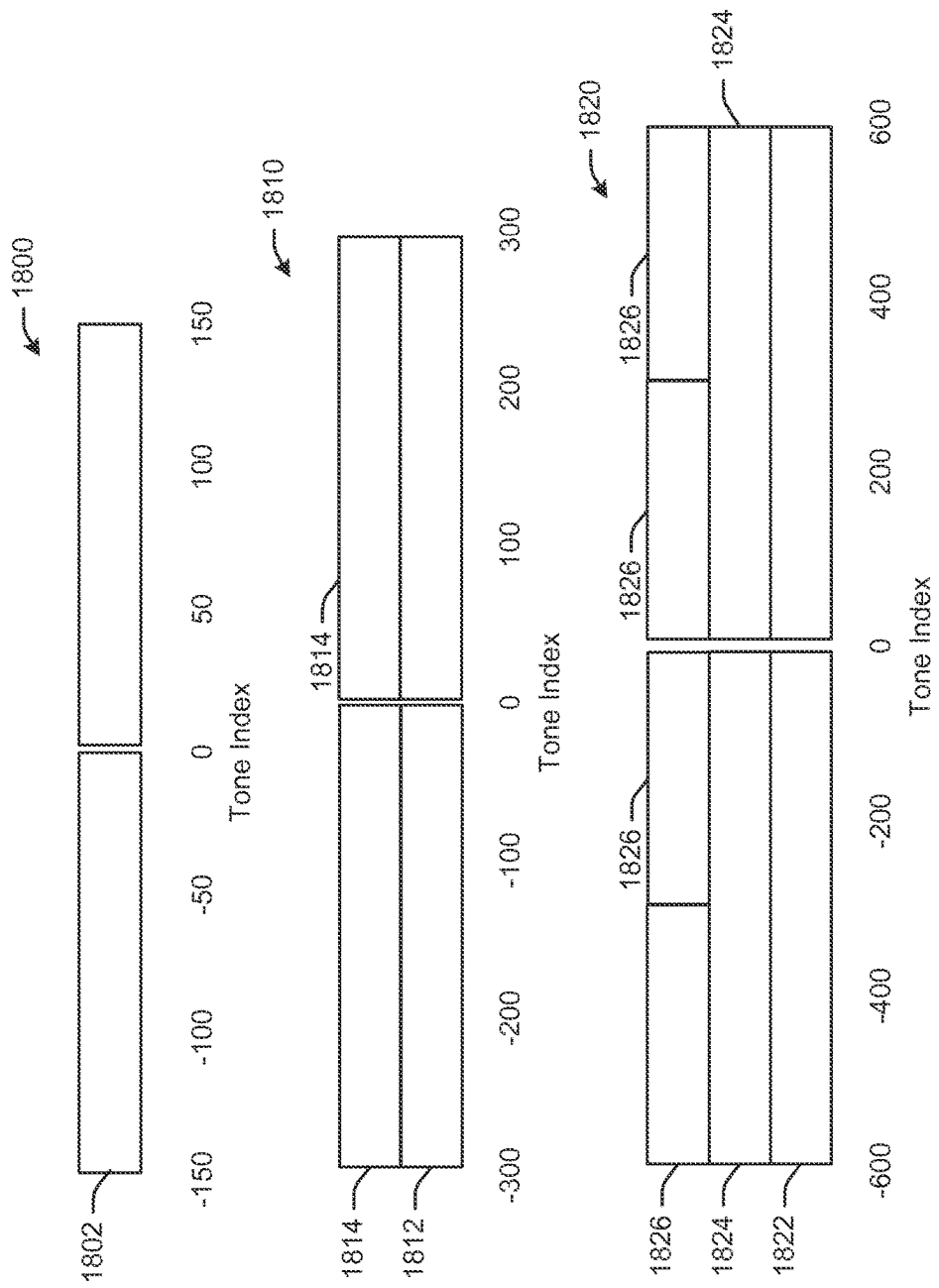
FIG. 18 depicts a datagram of possible example multi-user multi-input multi-output (MU-MIMO) resource blocks for 20 MHz, 40 MHz, and 80 MHz bandwidth channels, in accordance with example embodiments of the disclosure.

FIG. 18 depicts a datagram of possible example multi-user multi-input multi-output (MU-MIMO) resource blocks for 20 MHz 1800, 40 MHz 1810, and 80 MHz 1820 bandwidth channels, in accordance with example embodiments of the disclosure. In example embodiments, in MU-MIMO mode, the channels may not partitioned with as fine a granularity as when operating in OFDMA mode. In this case, the channel may be partitioned into larger sub-channel(s). For example, a block of 26 tones may not be used in MU-MIMO mode. Instead, in example embodiments, a minimum size multi-user (MU) partition may be 20 MHz. Thus in this case, a 20 MHz channel may only have one MU partition 1802 (e.g., the whole 20 MHz channel). A 40 MHz channel in MU-MIMO mode may be divided into two 20 MHz MU partitions 1814 or one 40 MHz MU partition 1812. Similarly, a 80 MHz channel may be partitioned into one 80 MHz MU partition 1822, two 40 MHz MU partitions 1824, four 20 MHz MU partitions 1826, or one 40 MHz MU partition 1824 and two 20 MHz MU partitions 1826.

Figure 19:
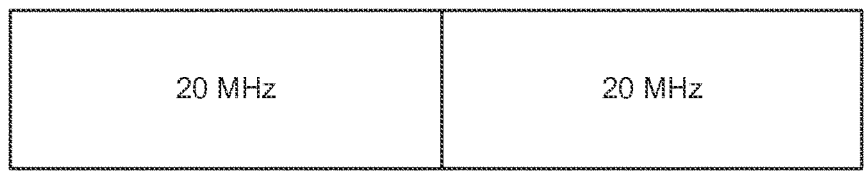
FIG. 19 depicts a datagram of possible MU partitions of a 40 MHz bandwidth with a minimum multi-user partition size for MU-MIMO for 242 tones in accordance with example embodiments of the disclosure.
Figure 19:

FIG. 19 depicts a datagram of possible MU partitions of a 40 MHz bandwidth with a minimum multi-user partition size for MU-MIMO for 242 tones in accordance with example embodiments of the disclosure. There may be two options in this case, for a MU partition scheme (e.g., partition constellation). One option, as depicted, may be a single 40 MHz partition 1902 and the other option may be two 20 MHz partitions 1900.

Figure 20:
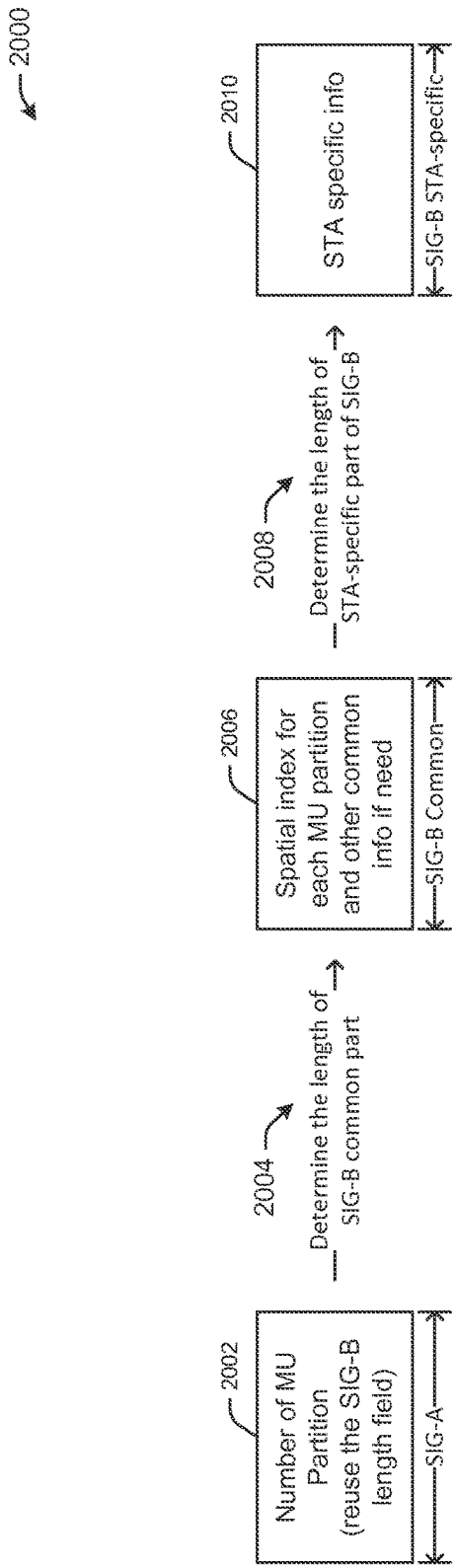
FIG. 20 depicts a block diagram of two options for indicating the resources for MU-MIMO in using an HE-SIG-B indication in accordance with an example embodiment of the disclosure.

FIG. 20 depicts a block diagram of a mechanism 2000 for resource indication in an HE-SIG-A and HE-SIG-B field of high-efficiency preamble, in accordance with example embodiments of the disclosure. The total number of MU partitions may be indicated in the HE-SIG-A 2002. In some example embodiments, the MU partitions may be indicated in the field that may be otherwise used for indicating the length of HE-SIG-B. For example, in some embodiments a 4-bit field in the HE-SIG-A indication may be used to indicate the duration (or length) of HE-SIG-B. Thus, instead of the number OFDM symbols, the HE-SIG-B length field may be redefined in the HE-SIG-A indication. The knowledge of the HE-SIG-B duration or length may be used by a scheduled STA to reset the automatic gain control (AGC) right after the HE-SIG-B, for the purposes of selectively listening to the remainder of the PPDU.

If there is a common part in the HE-SIG-B indication, the length of the SIG-B common part may be derived from the SIG-B length field 2004. In some embodiments, the scheduled STA may only use the length of the common part to decode the common part for learning about the total duration of SIG-B. The spatial index for each MU partition and other common info that may be needed may be indicated in the SIG-B common part 2006. The length of the STA-specific part of SIG-B may be determined 2008. The STA-specific info may be indicated in the SIG-B specific part 2010. By reusing the HE-SIG-B length field in HE-SIG-A as described above, an AP may indicate the bandwidth allocation pattern for the MU-MIMO PPDU. As discussed above, 0/1/3 bits may be used for 20/40/80 MHz to index all of the possible bandwidth allocations with 20 MHz granularity.

In some embodiments, given the maximum number of spatial stream of an MU partition, the number of bits for the spatial stream allocation may be determined and a fixed number. For example, in some embodiments 8 bits may be used to indicate up to 8 streams per MU. After an STA knows the bandwidth (or MU) allocation pattern, the STA can determine the number of bits for spatial stream allocation in the common part of the HE-SIG-B indication. For example, if there 3 MU partitions for MU-MIMO and the maximum number of supported streams is 8, there should be 3×8=24 bits for spatial stream allocation.

After a STA decodes the spatial stream allocation information, each STA knows how many STAs are scheduled in the current PPDU, e.g., the sum of spatial allocation numbers in each MU partition may be the total number of STAs in the PPDU. In one example, there may be two RUs over 40 MHz each with 20 MHz. The first MU partition may have 6 streams and they may be allocated to three STAs taking 1, 2, and 3 streams respectively. In this example, the second MU partition may have 8 streams and they are allocated to two STAs taking 4 and 4 streams respectively. A receiver STA knows that the total number of STAs is 3+2=5. The total number of STAs can be used to compute the duration of HE-SIG-B since the length of the STA specific part of the HE-SIG-B is proportional to the number of scheduled STAs.

Each scheduled STA may decode the STA-specific part of the HE-SIG-B indication and use the order listed in the STA-specific part to determine the frequency RU and the spatial streams assigned to it. In some embodiments, the STA listing order may be frequency resource first. In other embodiments, the STA listing order may be spatial resource first.

Figure 21:
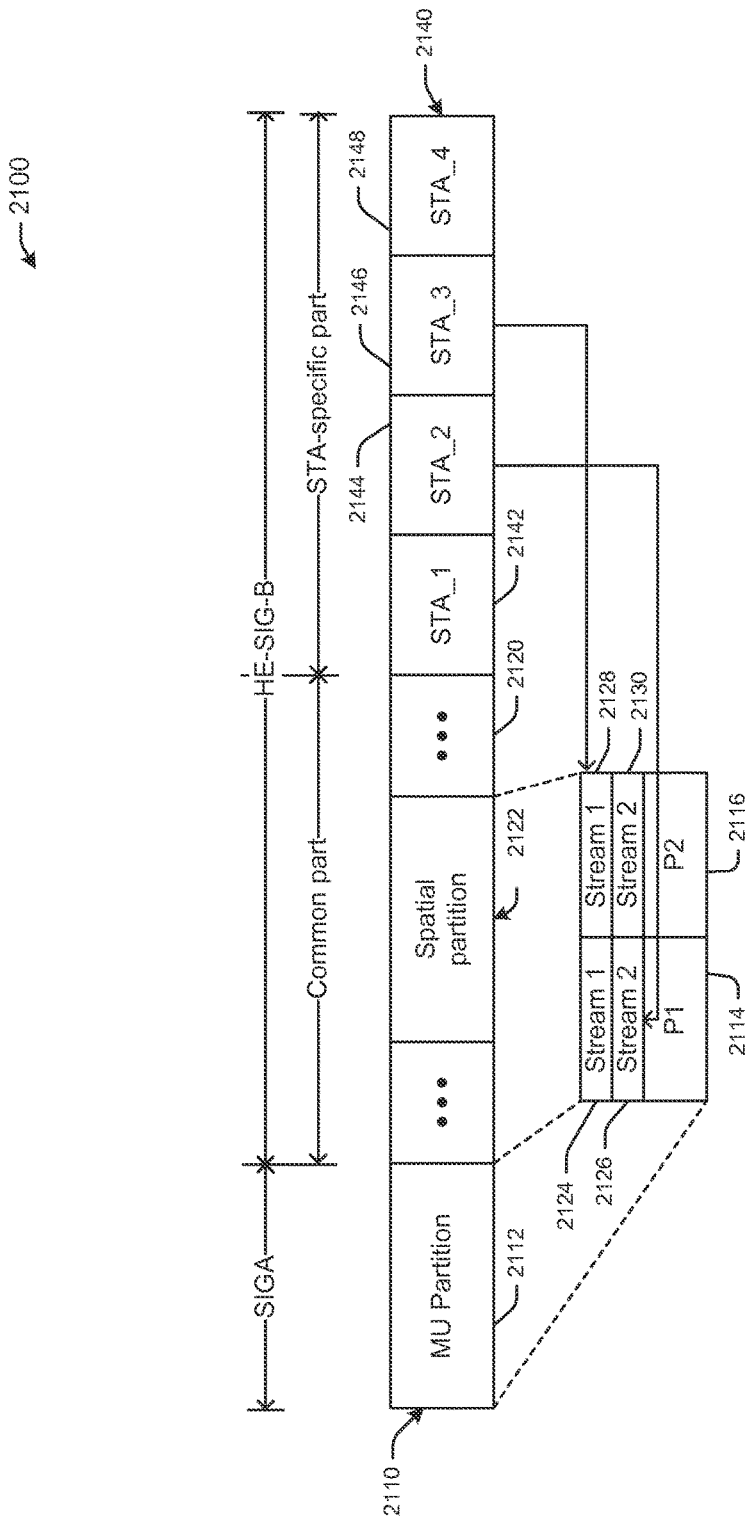
FIG. 21 depicts a datagram that illustrates an example mechanism for indicating multi-user partition and spatial partition to a plurality of station devices, in accordance with example embodiments of the disclosure.

FIG. 21 depicts a datagram that illustrates an example mechanism 2100 for indicating multi-user partition 2212 and spatial partition 2122 to a plurality of station devices 140, in accordance with example embodiments of the disclosure. After STAs 140 decode the HE-SIG-A 2110 and the common part of the HE-SIG-B 2122, the STAs 140 know there are 2 MU partitions, each of which has two spatial streams assigned to two STAs 140. After STAs 140 decode the RU partition and spatial partition, STA_2 2144 in the 2nd place in the STA-specific part 2140 of the HE-SIG-B indication may determine that the 2nd stream 2126 in the first MU partition 2114 is its assigned stream. Furthermore, a STA_3 in the 3rd place 2146 in the STA-specific part 2140 of the HE-SIG-B indication may determine that the first stream 2228 in the second MU partition 2116 is its assigned stream. Similarly, from this preamble 2100, STA_1 2142 may determine that its assigned resources are stream 1 2124 of the first partition 2114 and STA_4 may determine that its assigned resources may be stream 2 2230 of the second partition 2116.

As noted above, in some embodiments the stream allocation may include 8 bits for up to 8 streams. In some embodiments, the number of bits and/or streams may be reduced to 6. In some embodiments, different permutations of the same set of stream numbers are counted as different allocation patterns. Because the AP can permute the STA order in the allocation list, there is no need to assign additional indexes to the stream number permutations. Thus, only one index may be assigned to each distinct set of stream numbers. For example, (2,1,3), (1,2,3), (3,1,2), (1,3,2), (3,2,1), and (2,3,1) may share the same allocation pattern index and only one of the six permutations e.g. (1,2,3) may be allowed to be used by the AP scheduling. As the spatial streams may be arbitrarily indexed as long as the corresponding beamforming vectors are applied correspondingly, the performance is not affected by removing the permutations in indication signaling.

In some embodiments, the stream indexes for the same STA 140 may be contiguous, thus reducing overhead. For example, Table 3 below lists all the stream allocation for up to 8 streams per MU partition.

TABLE 3

| | Stream allocations for 8 streams per MU partitions | | | | | | | |
|---|---|---|---|---|---|---|---|---|
| | Total number of streams | | | | | | | |
| | STA 1 stream number | STA 2 stream number | STA 3 stream number | STA 4 stream number | STA 5 stream number | STA 6 stream number | STA 7 stream number | STA 8 stream number |
| 1 (1 pattern) | 1 | | | | | | | |
| 2 (2 patterns) | 1 | 1 | | | | | | |
| | 2 | | | | | | | |
| 3 (3 patterns) | 1 | 1 | 1 | | | | | |
| | 1 | 2 | | | | | | |
| | 3 | | | | | | | |
| 4 (5 patterns) | 1 | 1 | 1 | 1 | | | | |
| | 1 | 1 | 2 | | | | | |
| | 1 | 3 | | | | | | |
| | 2 | 2 | | | | | | |
| | 4 | | | | | | | |

TABLE 3-continued

Stream allocations for 8 streams per MU partitions

| | Total number of streams | | | | | | | |
|---|---|---|---|---|---|---|---|---|
| | STA 1 stream number | STA 2 stream number | STA 3 stream number | STA 4 stream number | STA 5 stream number | STA 6 stream number | STA 7 stream number | STA 8 stream number |
| 5 (7 patterns) | 1 | 1 | 1 | 1 | 1 | | | |
| | 1 | 1 | 1 | 2 | | | | |
| | 1 | 1 | 3 | | | | | |
| | 1 | 2 | 2 | | | | | |
| | 1 | 4 | | | | | | |
| | 2 | 3 | | | | | | |
| | 5 | | | | | | | |
| 6 (11 patterns) | 1 | 1 | 1 | 1 | 1 | 1 | | |
| | 1 | 1 | 1 | 1 | 2 | | | |
| | 1 | 1 | 1 | 3 | | | | |
| | 1 | 1 | 2 | 2 | | | | |
| | 1 | 1 | 4 | | | | | |
| | 1 | 2 | 3 | | | | | |
| | 1 | 5 | | | | | | |
| | 2 | 2 | 2 | | | | | |
| | 2 | 4 | | | | | | |
| | 3 | 3 | | | | | | |
| | 6 | | | | | | | |
| 7 (15 patterns) | 1 | 1 | 1 | 1 | 1 | 1 | 1 | |
| | 1 | 1 | 1 | 1 | 1 | 2 | | |
| | 1 | 1 | 1 | 1 | 3 | | | |
| | 1 | 1 | 1 | 2 | 2 | | | |
| | 1 | 1 | 1 | 4 | | | | |
| | 1 | 1 | 2 | 3 | | | | |
| | 1 | 1 | 5 | | | | | |
| | 1 | 2 | 2 | 2 | | | | |
| | 1 | 2 | 4 | | | | | |
| | 1 | 3 | 3 | | | | | |
| | 1 | 6 | | | | | | |
| | 2 | 2 | 3 | | | | | |
| | 2 | 5 | | | | | | |
| | 3 | 4 | | | | | | |
| | 7 | | | | | | | |
| 8 (22 patterns) | 1 | 1 | 1 | 1 | 1 | 1 | 1 | 1 |
| | 1 | 1 | 1 | 1 | 1 | 1 | 2 | |
| | 1 | 1 | 1 | 1 | 1 | 3 | | |
| | 1 | 1 | 1 | 1 | 2 | 2 | | |
| | 1 | 1 | 1 | 1 | 4 | | | |
| | 1 | 1 | 1 | 2 | 3 | | | |
| | 1 | 1 | 1 | 5 | | | | |
| | 1 | 1 | 2 | 2 | 2 | | | |
| | 1 | 1 | 2 | 4 | | | | |
| | 1 | 1 | 3 | 3 | | | | |
| | 1 | 1 | 6 | | | | | |
| | 1 | 2 | 2 | 3 | | | | |
| | 1 | 2 | 5 | | | | | |
| | 1 | 3 | 4 | | | | | |
| | 1 | 7 | | | | | | |
| | 2 | 2 | 2 | 2 | | | | |
| | 2 | 2 | 4 | | | | | |
| | 2 | 3 | 3 | | | | | |
| | 2 | 6 | | | | | | |
| | 3 | 5 | | | | | | |
| | 4 | 4 | | | | | | |
| | 8 | | | | | | | |
| Total number of patterns | 1 + 2 + 3 + 5 + 7 + 11 + 15 + 22 = 66 | | | | | | | |

Excluding 8 single user patterns, the remaining 58 allocation patterns may be indexed by 6 bits. In other embodiments, the single user patterns may be included and the allocation patterns may be indexed by 7 bits. This indexing may be provided as part of the common part of the HE-SIG-B to indicate the spatial partitions of the resource allocations in MU-MIMO mode.

In addition to the location (e.g., stream index) and size (e.g., the number of streams allocated to a STA) of the stream allocation, the receiver STA 140 may also determine the total number of streams of each MU partition. The maximum number of all the MU partitions may determine the number of HE-LTF symbols for a whole band. For example, in an embodiments having one MU partition with 5 streams and one MU partition with 4 streams, the number of LTF symbols may be the same for both MU partitions. The number of HE-LTF symbols for the whole band may be 8 if 5×5, 6×6, or 7×7 P-matrix is not defined. Thus, the number of HE-LTF symbols may not need to be specific using an additional 3-bits. The number of HE-LTF symbols may be determined from the total number of streams for each MU partition.

Figure 22:
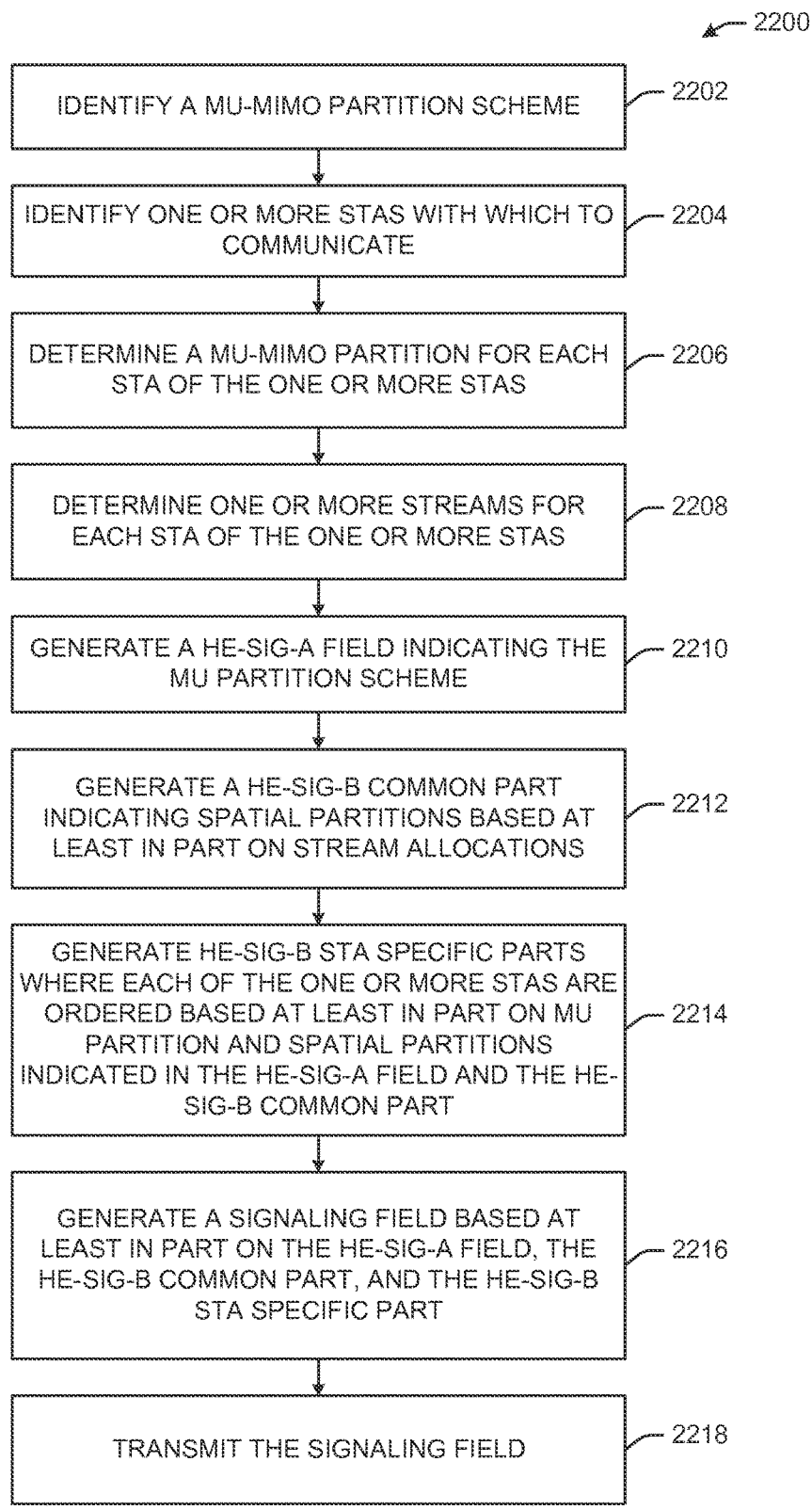
FIG. 22 depicts a flow diagram illustrating an example method for generating a high efficiency wireless preamble with a HE-SIG-B portion with a common part and a STA specific part indicating an allocation of multi-user partitions to respective STAs, in accordance with example embodiments of the disclosure.

FIG. 22 depicts a flow diagram illustrating an example method 2200 for generating a high efficiency wireless preamble with a HE-SIG-B portion with a common part and a STA specific part indicating an allocation of multi-user partitions to respective STAs 140, in accordance with example embodiments of the disclosure. The processes of method 2200 may be performed by the AP 110 in cooperation with one or more elements of environment 100, in example embodiments of the disclosure.

At block 2202, a MU-MIMO partition scheme may be identified. This partition may be based at least in part on the channel bandwidth available for MU-MIMO. The MU partition scheme may further be determined based at least in part on the bandwidth needs of each of the STAs 140, in some example embodiments. At block 2204, one or more STAs with which the AP is to communicate may be identified. The STAs may be identified by any variety of suitable handshaking procedures and/or from prior interactions with the AP 110. In example embodiments, the process of block 2204 may occur prior to the process of block 2202.

At block 2206, a MU-MIMO partition for each STA of the one or more STAs may be determined. At block 2208, one or more streams for each STA of the one or more STAs may be determined. In some example embodiments, the MU partition and the spatial partitions may be based at least in part on the bandwidth needs of each of the STAs 140.

At block 2210, a HE-SIG-A field indicating the MU partition may be generated. This MU partition indication, in example embodiments, may be based on 0 bits for a 20 MHz channel, 1 bit for a 40 MHz channel, and/or 3 bits for a 80 MHz channel. As discussed above, the MU partition indicator may provided in a field that would otherwise specify the length of the common part of the HE-SIG-B. At block 2212, a HE-SIG-B common part indicating spatial partitions based at least in part on the stream allocations may be generated. The spatial partition indicator may be a series of spatial partition indexes corresponding to each MU partition.

At block 2214, HE-SIG-B STA specific parts may be generated where each of the one or more STAs are ordered based on at least in part on MU partition and spatial partitions indicated in the HE-SIG-A field and the HE-SIG-B common part. The STAs may be able to determine their MU partition and spatial partition from the order of the STAs. At block 2216, a signaling field may be generated based at least in part on the HE-SIG-A field, the HE-SIG-B common part, and the HE-SIG-B STA specific parts. The signaling field may be part of a preamble of a PPDU. At block 2218, the signaling field may be transmitted.

It should be noted, that the method 2200 may be modified in various ways in accordance with certain embodiments of the disclosure. For example, one or more operations of method 2200 may be eliminated or executed out of order in other embodiments of the disclosure. Additionally, other operations may be added to method 2200 in accordance with other embodiments of the disclosure.

Figure 23:
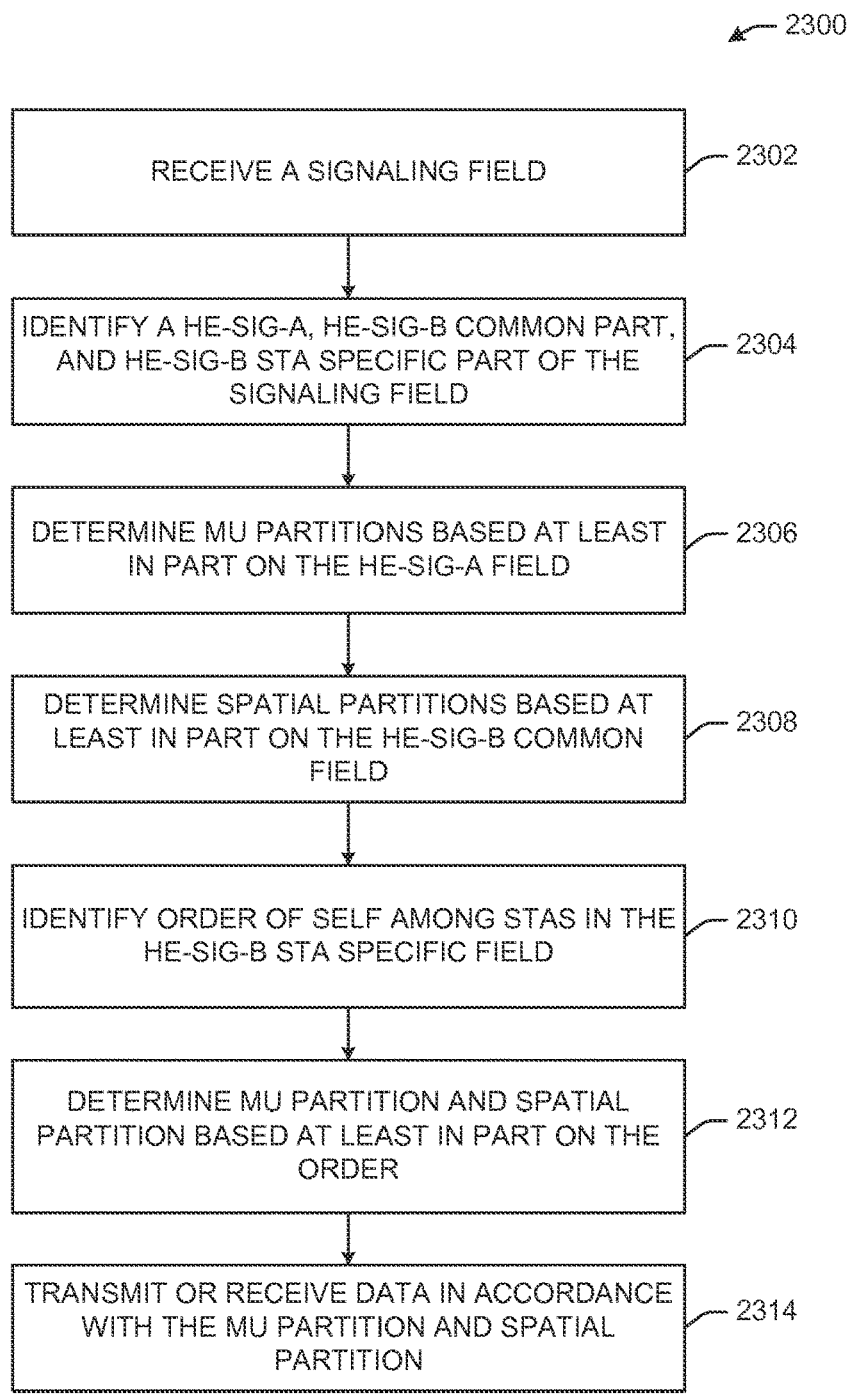
FIG. 23 depicts a flow diagram illustrating an example method for receiving a high efficiency wireless preamble with a HE-SIG-B portion with a common part and a STA specific part indicating an allocation of multi-user partitions and spatial partitions to respective STAs, in accordance with example embodiments of the disclosure.

FIG. 23 depicts a flow diagram illustrating an example method for receiving a high efficiency wireless preamble with a HE-SIG-B portion with a common part and a STA specific part indicating an allocation of multi-user partitions and spatial partitions to respective STAs, in accordance with example embodiments of the disclosure. The processes of method 2300 may be performed by the STAs 140 in cooperation with one or more elements of environment 100, in example embodiments of the disclosure.

At block 2302, a signaling field may be received. This signaling field may be part of a PPDU preamble and may include high-efficiency wireless local area network (HEW) portions therein. In example embodiments, the signaling field may be the same or similar to the signaling field transmitted in accordance with block 2218 of FIG. 22.

At block 2304, a HE-SIG-A, HE-SIG-B common part, and a HE-SIG-B STA specific part of the signaling field may be identified. In example embodiments, this may be performed by parsing the preamble of the PPDU in which the signaling field is carried. In example embodiments, the preamble may contain legacy headers, in which the HE-SIG-A portion of the HEW header may be indicated. Furthermore, information carried in the HE-SIG-A may enable determining the length of the HE-SIG-B common part and/or the STA specific parts.

At block 2306, the MU partition scheme may be determined based at least in part on the HE-SIG-A. At block 2308, the spatial partitions may be determined based at least in part on the HE-SIG-B common field. At block 2310, the order of the STA performing the processes of method 2300 (e.g., self) may be determined may be identified within the HE-SIG-B STA specific field. At block 2312, the MU partition and spatial partition may be determined based at least in part on the order. At block 2314, data may transmitted and/or received in accordance with the MU partition and spatial partition.

It should be noted, that the method 2300 may be modified in various ways in accordance with certain embodiments of the disclosure. For example, one or more operations of method 2300 may be eliminated or executed out of order in other embodiments of the disclosure. Additionally, other operations may be added to method 2300 in accordance with other embodiments of the disclosure.

Figure 24:
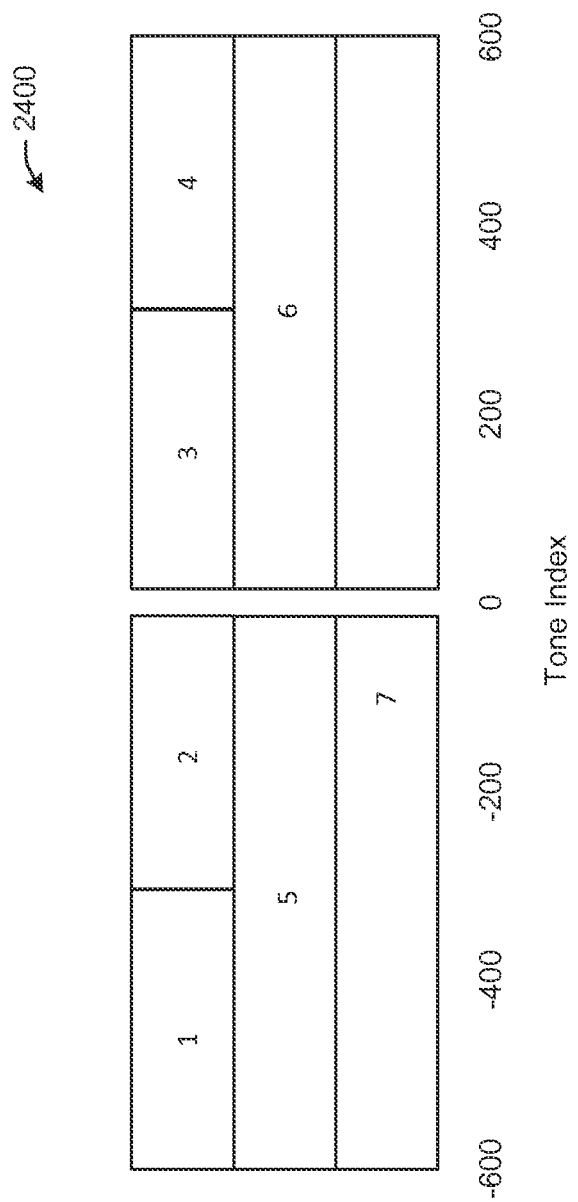
FIG. 24 is a datagram of an example multi-user partition indexing for a 80 MHz channel, in accordance with example embodiment of the disclosure.

FIG. 24 is a datagram of an example multi-user partition 2400 indexing for a 80 MHz channel, in accordance with example embodiment of the disclosure. In these example embodiments, the HE-SIG-B indication may only include an STA-specific part and may not include a common part. In such embodiments, each scheduled STA may be assumed to only decode its corresponding specific part. The allocation information may be distributed in each scheduled STAs specific part. In example embodiments, 3 bits may be used to indicate the 7 possible MU partitions with their locations and sizes. It should be appreciated that such indexing may be easily extended to other bandwidths. For example, 0/2/3 bits may be used for 20/40/80 MHz allocations.

As noted above, in such embodiments the stream allocation may only be in each scheduled STAs specific part Given the maximum number of supported streams in one MU partition, the stream index for each STA may be indicated using Table 4 and Table 5 below.

TABLE 4

Stream index for 8 streams per MU partition

| Number of allocated streams to the STA | Number of locations of the allocated streams | Locations of the streams allocated the STA |
| --- | --- | --- |
| 1 | 8 | 1, 2, 3, 4, 5, 6, 7, 8 |
| 2 | 4 | (1, 2), (3, 4), (5, 6), (7, 8) |

TABLE 4-continued

Stream index for 8 streams per MU partition

| Number of allocated streams to the STA | Number of locations of the allocated streams | Locations of the streams allocated the STA |
|---|---|---|
| 3 | 3 | (1, 2, 3), (4, 5, 6), (6, 7, 8) |
| 4 | 2 | (1, 2, 3, 4), (5, 6, 7, 8) |
| 5 | 1 | (12, 3, 4, 5) |
| 6 | 1 | (1, 2, 3, 4, 5, 6) |
| 7 | 1 | (1, 2, 3, 4, 5, 6, 7) |
| 8 | 1 | (1, 2, 3, 4, 5, 6, 7, 8) |
| Total | 21 | |

TABLE 5

Stream index for 4 streams per MU partition

| Number of allocated streams to the STA | Number of locations of the allocated streams | Locations of the streams allocated the STA |
|---|---|---|
| 1 | 4 | 1, 2, 3, 4 |
| 2 | 2 | (1, 2), (3, 4) |
| 3 | 1 | (1, 2, 3) |
| 4 | 1 | (1, 2, 3, 4) |
| Total | 8 | |

In example embodiments, 5 (or 3) bits may be used to indicate the stream allocation for up to 8 (or 4) streams. The stream allocation index may indicate to the receiver STA which streams are allocated to it. To indicate the number of LTF symbols, the table entries of each of the spatial partitions of Table 4 and Table 5 may be indexed. The index may indicate which streams are allocated to the STA 140 but also the maximum number of streams across the band. For example, if the number of LTF symbols may only be 4 or 8, the 21+8=29 locations in Table 4 and Table 4 may be indexed using 5 bits. After decoding the index, the receiver STA may determine which streams are allocated to it and whether 4 or 8 is the number of LTF symbols.

Figure 25:
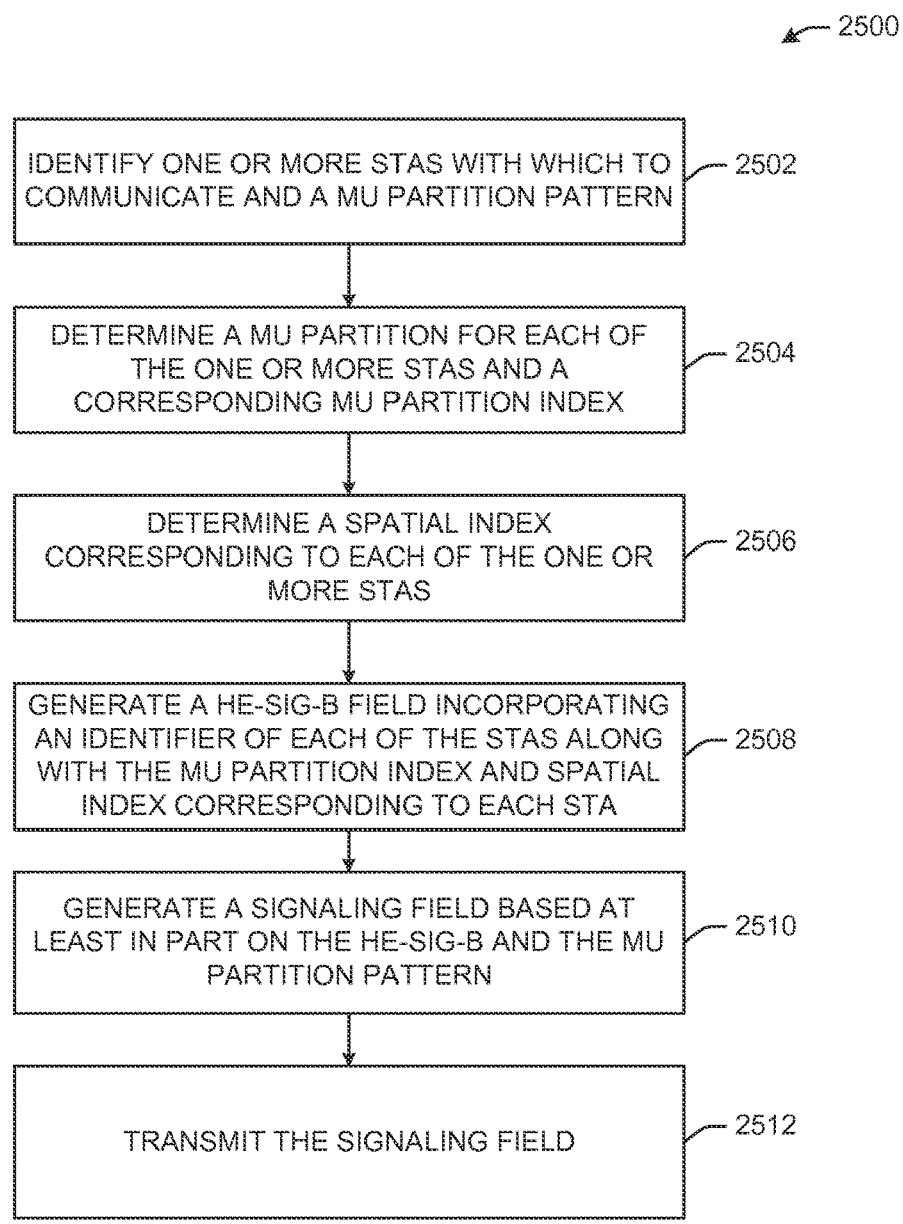
FIG. 25 depicts a flow diagram illustrating an example method for generating a high efficiency wireless preamble with a HE-SIG-B portion with only a STA specific part indicating an allocation index of a multi-user partition and an index of a spatial partition, in accordance with example embodiments of the disclosure.

FIG. 25 depicts a flow diagram illustrating an example method for generating a high efficiency wireless preamble with a HE-SIG-B portion with only a STA specific part indicating an allocation index of a multi-user partition and an index of a spatial partition, in accordance with example embodiments of the disclosure. The processes of method 2500 may be performed by the AP 110 in cooperation with one or more elements of environment 100, in example embodiments of the disclosure. At block 2502, one or more STAs with which to communicate and a MU partition pattern may be identified. At block 2504, a MU partition for each of the one or more STAs and a corresponding MU partition index may be determined. At block 2506, a spatial index corresponding to each of the one or more STAs may be determined. At block 2508, a HE-SIG-B field incorporating an identifier of each of the STAs along with the MU partition index and spatial index corresponding to each STA may be generated. At block 2510, a signaling field based at least in part on the HE-SIG-B and the MU partition pattern may be generated. At block 2512, the signaling field may be transmitted.

It should be noted, that the method 2500 may be modified in various ways in accordance with certain embodiments of the disclosure. For example, one or more operations of method 2500 may be eliminated or executed out of order in other embodiments of the disclosure. Additionally, other operations may be added to method 2500 in accordance with other embodiments of the disclosure.

Figure 26:
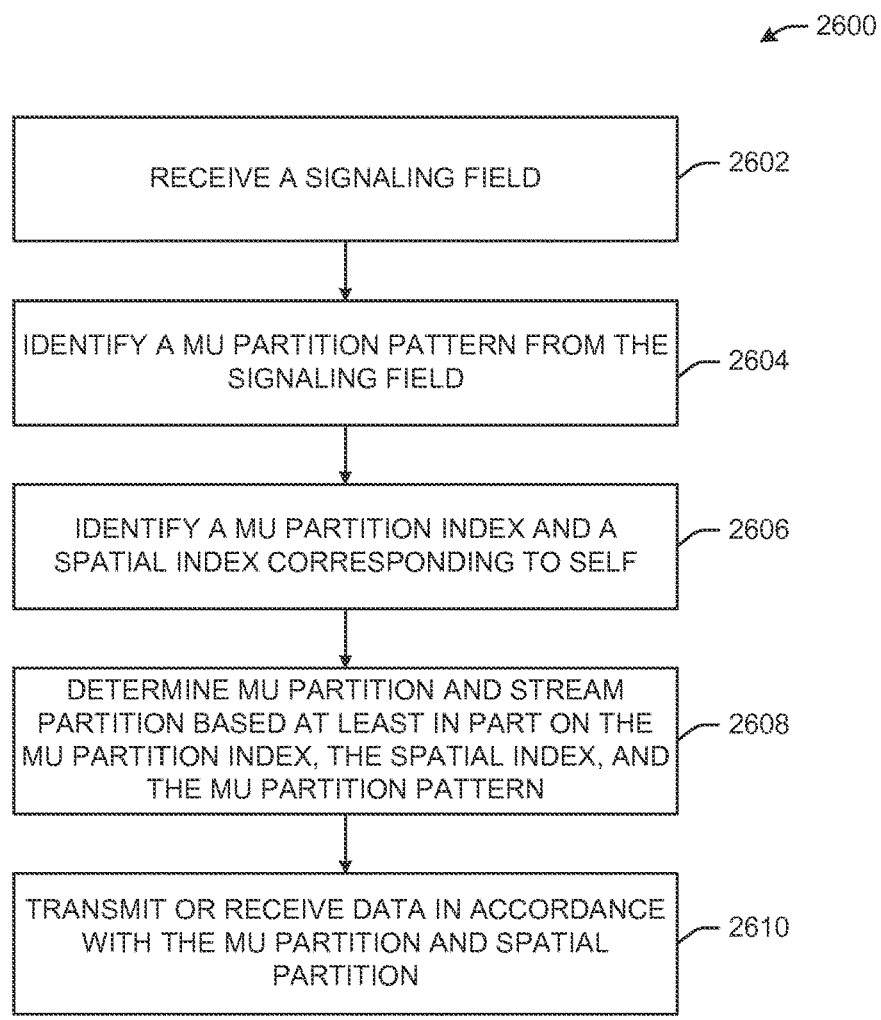
FIG. 26 depicts a flow diagram illustrating an example method for generating a high efficiency wireless preamble with a HE-SIG-B portion with only a STA specific part indicating an allocation index of a multi-user partition and an index of a spatial partition, in accordance with example embodiments of the disclosure.

FIG. 26 depicts a flow diagram illustrating an example method for generating a high efficiency wireless preamble with a HE-SIG-B portion with only a STA specific part indicating an allocation index of a multi-user partition and an index of a spatial partition, in accordance with example embodiments of the disclosure. The processes of method 2600 may be performed by the STAs 140 in cooperation with one or more elements of environment 100, in example embodiments of the disclosure. At block 2602, a signaling field may be received. At block 2604, a MU partition pattern may be identified from the signaling field. At block 2606, a MU pattern index and a spatial index corresponding to the STA performing the processes of method 2600 (e.g., self-identifier) may be identified. At block 2608, MU partition and stream partition may be determined based at least in part on the MU partition index, the spatial index, and the MU partition pattern.

It should be noted, that the method 2600 may be modified in various ways in accordance with certain embodiments of the disclosure. For example, one or more operations of method 2600 may be eliminated or executed out of order in other embodiments of the disclosure. Additionally, other operations may be added to method 2600 in accordance with other embodiments of the disclosure.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

According to example embodiments of the disclosure, there may be one or more non-transitory computer-readable media comprising computer-executable instructions that, when executed by one or more processors, configure the one or more processors to perform operations comprising: identifying a first partial access identification (PAID) corresponding to a first station device (STA); identifying a second PAID corresponding to a second STA; determining a first resource unit (RU) to allocate to the first STA; determining a second RU to allocate to the second STA; generating a high efficiency wireless (HEW) preamble based at least in part on the first PAID, second PAID, an indication of the first RU allocation, and an indication of the second RU allocation, wherein the indication of the first RU allocation comprises a first RU allocation index, wherein the first RU allocation index identifies the first RU on a RU allocation pattern, wherein the indication of the second RU allocation comprises a second RU allocation index, and wherein the second RU allocation index identifies the second RU on the RU allocation pattern; and initiating transmission, via a transceiver and one or more antennas, of the HEW preamble. In example embodiment, the operations further comprise generating a protocol data unit, wherein the protocol data unit includes the HEW preamble. In further example embodiments, generating the HEW preamble comprises generating a first portion of the HEW preamble, wherein the first portion of the preamble includes a STA specific part indicating the first PAID, the first RU allocation index, the second PAID, and the second RU allocation index. In still further example embodiments, the first portion of the HEW preamble further includes a first modulation and coding scheme (MCS) index corresponding to the first STA, a first cyclic redundancy check (CRC) corresponding to the first RU allocation index, a second MCS index corresponding to the second STA, and a second CRC corresponding to the second RU allocation index. In yet further example embodiments, generating the HEW preamble comprises generating a first portion of the HEW preamble, wherein the first portion of the preamble includes a common part and a STA specific part, wherein the common part indicates the RU allocation pattern corresponding to a mapping of a plurality of RU allocation to corresponding respective RU allocation indices, wherein the first RU allocation index and second RU allocation index are selected from among the respective RU allocation indices. In some aspects, the HEW preamble includes a second portion including information to decode the first part of the HEW preamble. Further still, in accordance with embodiments of the disclosure, the information to decode the first part of the HEW preamble includes at least one of: (i) a modulation and coding scheme (MCS) of the first portion; (ii) a length of the first portion; or (iii) a guard interval of the first portion. In other example embodiments, the preamble includes a legacy portion configured to provide information for backward compatibility.

According to some example embodiments of the disclosure, there may be a wireless device, comprising: at least one antenna configured to transmit wireless signals; a transceiver communicatively coupled to the at least one antenna; at least one memory that stores computer-executable instructions; and at least one processor configured to access the at least one memory, wherein the at least one processor is communicatively coupled to the transceiver and is further configured to execute the computer-executable instructions to: identify a first identifier corresponding to a first station device (STA); identify a second identifier corresponding to a second STA; determine a first resource unit (RU) index corresponding to a first RU allocation to the first STA, wherein the first RU allocation is selected from a RU allocation pattern; determine a second RU index corresponding to a second RU allocation to the second STA, wherein the first RU allocation is selected from a RU allocation pattern; generate a high efficiency wireless (HEW) preamble based at least in part on the first identifier, the second identifier, the first RU allocation index, and the second RU allocation index; and transmit, via the transceiver and using the antenna, the HEW preamble. In example embodiments, the first identifier is a partial access identifier (PAID) of the first STA. In still further example embodiments, generating the HEW preamble comprises generating a common part of the HEW preamble and a STA specific part of the HEW preamble, wherein the common part indicates the RU allocation pattern and the STA specific part includes the first RU index and the second RU index. In some further example embodiments, the HEW preamble includes a second portion including information to decode the first part of the HEW preamble.

According to example embodiments of the disclosure, there may be one or more non-transitory computer-readable media comprising computer-executable instructions that, when executed by one or more processors, configure the one or more processors to perform operations comprising: identifying a first resource unit (RU) allocation index corresponding to a first resource allocation to a first station device (STA) with a first identifier; identifying a second RU allocation index corresponding to a second resource allocation to a second station device (STA) with a second identifier; generating a common part of a first signaling field by ordering first RU index before the second RU index; generating a STA specific part of the first signaling field by ordering the first identifier before the second identifier; generating a second signaling field having information for decoding the first signaling field; and generating a high efficiency wireless (HEW) preamble based at least in part on the first signaling field and the second signaling field. In further example embodiments, the operations further comprise generating a protocol data unit, wherein the protocol data unit includes the HEW preamble. In still further example embodiments, the order of the first identifier before the second identifier and the order of the first RU index before the second RU index indicates that the first STA corresponds to the first RU allocation and the second STA corresponds to the second RU allocation.

In accordance with example embodiments of the disclosure, there may be a wireless device, comprising: at least one antenna configured to transmit wireless signals; a transceiver communicatively coupled to the at least one antenna; at least one memory that stores computer-executable instructions; and at least one processor configured to access the at least one memory, wherein the at least one processor is communicatively coupled to the transceiver and is further configured to execute the computer-executable instructions to: receive a high efficiency wireless (HEW) preamble with a signaling field, the signaling field having a common part and a STA specific part; determine, from the common part, a resource unit (RU) allocation pattern corresponding to a mapping of a plurality of RU allocations to corresponding respective RU allocation indices; identifying, from the STA specific part, a RU allocation index; determine a RU allocation based at least in part on the RU allocation index and the RU allocation pattern; and transmit or receive data according to the RU allocation. In further example embodiments, determining the RU allocation further comprises: identifying an identifier corresponding to the wireless device; identifying the identifier within the STA specific part of the signaling field; and identifying a predetermined number of bits following the identifier in the STA specific part of the signaling field as the RU allocation index. In still further example embodiments, the identifier is a partial access identifier (PAID) corresponding to the wireless device. In yet further example embodiments, the HEW preamble is received, from an access point device, as part of a protocol data unit.

In accordance with example embodiments of the disclosure, there may be one or more non-transitory computer-readable media comprising computer-executable instructions that, when executed by one or more processors, configure the one or more processors to perform operations comprising: receive a protocol data unit (PDU); identify a high efficiency wireless (HEW) preamble of the PDU; identify, by the STA, a first portion of the HEW preamble and a second portion of the HEW preamble; determine a resource unit (RU) allocation pattern from the first portion of the HEW preamble; and determine a RU allocation index of a station device (STA) from the second portion of the HEW; and determine an RU allocation of the STA based at least in part on the RU allocation pattern and the RU allocation index. In some example embodiments, determining the RU allocation further comprises the operations of: identify an identifier corresponding to the STA; identify the identifier within the STA specific part of the signaling field; and identify a predetermined number of bits following the identifier in the STA specific part of the signaling field as the RU allocation index. In still further example embodiments, the identifier is a partial access identifier (PAID) corresponding to the wireless device.

According to example embodiments of the disclosure, there may be one or more non-transitory computer-readable media comprising computer-executable instructions that, when executed by one or more processors, configure the one or more processors to perform operations comprising: identifying one or more station devices (STA) to which a multi-user (MU) partition and spatial partition are to be assigned; generating a first field in a frame, wherein the first field indicates one or more (MU) partitions of a channel bandwidth; generating a common part of a second field, wherein the common part of the second field indicates one or more spatial partitions of each of the one or more MU partitions; generating a STA specific part of the second field, wherein the STA specific field indicates an ordered set of identifiers, each of the identifiers corresponding to a respective STA; generating the frame including the first field, the common part of the second field, the STA specific part of the second field; and initiating transmission, via a transceiver, the frame. In some example embodiments, the frame is a preamble of a physical layer convergence protocol (PLCP) protocol data unit (PPDU). In still further example embodiments, the identifiers are a partial access identifier (PAID) of each of the corresponding respective STAs. In yet further example embodiments, the one or more STAs include a first STA with a first identifier and a second STA with a second identifier, wherein the one or more MU partitions include a first partition and a second partition, wherein the STA specific part of the second field includes the second identifier after the first identifier, and wherein the first STA is allocated the first MU partition and the second STA is allocated the second MU partition. In accordance with the disclosure, the common part of the second partition indicates a one spatial partition for each of the first MU partition and the second MU partition using a first spatial index corresponding to the first MU partition and a second spatial index corresponding to the second spatial index. In still further example embodiments, the minimum bandwidth of each of the one or more MU partitions operating in a multi-user multi-input multi-output (MU-MIMO) mode is 20 MHz.

According to example embodiments, there may be a wireless device, comprising: at least one antenna configured to transmit wireless signals; a transceiver communicatively coupled to the at least one antenna; at least one memory that stores computer-executable instructions; and at least one processor configured to access the at least one memory, wherein the at least one processor is communicatively coupled to the transceiver and is further configured to execute the computer-executable instructions to: providing a multi-user (MU) partition indication in a HE-SIG-A field in a frame; providing a spatial partition indication in a HE-SIG-B field in the frame, the HE-SIG-B field comprising a common part and a station device (STA) specific part, the common part comprising the spatial partition indication; providing at least one identifier corresponding to respective STA in the STA specific part of the HE-SIG-B field; and generating a preamble structure based at least in part on the HE-SIG-A field and the HE-SIG-B field. In some example embodiments, the MU partition indication is based at least in part on one or more MU partition index bits. In further example embodiments, the MU partition indication is further based at least in part on a channel bandwidth. In still further example embodiments, an order of the first STA field and the second STA field indicate the order of frequency resource mapping.

According to example embodiments of the disclosure, there may be one or more non-transitory computer-readable media comprising computer-executable instructions that, when executed by one or more processors, configure the one or more processors to perform operations comprising: identifying a first multi-user (MU) partition index corresponding to a first MU partition of a first station device (STA) with a first identifier; identifying a second MU partition index corresponding to a second MU partition of a second STA with a second identifier; identifying a first spatial index corresponding to a first spatial partition of the first STA; identifying a second spatial index corresponding to a second spatial partition of the second STA; generating a signaling field by ordering the first identifier, the first MU partition index, the first spatial index, the second identifier, the second MU partition index, the second spatial index; and initiating transmission, via a transceiver and one or more antennas, the signaling field. In some example embodiments, the signaling field is a first signaling field, and wherein the operations further comprise: generating a second signaling field, wherein the signaling field includes information to decode the first signaling field. In further example embodiments, the signaling field is part of a high efficiency wireless (HEW) preamble of a physical layer convergence protocol (PLCP) protocol data unit (PPDU).

According to further example embodiments of the disclosure, there may be a wireless device, comprising: at least one antenna configured to transmit wireless signals; a transceiver communicatively coupled to the at least one antenna; at least one memory that stores computer-executable instructions; and at least one processor configured to access the at least one memory, wherein the at least one processor is communicatively coupled to the transceiver and is further configured to execute the computer-executable instructions to: receive a high efficiency wireless (HEW) preamble having a signaling field, the signaling field having a station device (STA) specific part; identify an identifier of the wireless device; detect the identifier in the STA specific part; determine, based on the detection, a multi-user (MU) partition index and a spatial index corresponding to the wireless device; determine, based at least in part on the MU partition index, a MU partition allocated to the wireless device; and determine, based at least in part on the spatial index, one or more streams allocated to the wireless device. In some example embodiments, the at least one processor is further configured to transmit or receive data according to the MU partition and the one or more streams. In still further example embodiments, the identifier is a partial access identifier (PAID) of the wireless device.

According to yet further example embodiments of the disclosure, there may be one or more non-transitory computer-readable media comprising computer-executable instructions that, when executed by one or more processors, configure the one or more processors to perform operations comprising: receiving a high efficiency wireless (HEW) preamble with a first signaling field and a second signaling field, the second signaling field having a common part and a station device (STA) specific part; determining, from the first signaling field, one or more multi-user (MU) partitions; determining, from the common part, one or more spatial partitions; identifying an identifier of a STA; identifying, from the STA specific part, an order of the identifier form among one or more identifiers; determining, based at least in part on the order, a particular MU partition and a particular spatial partition corresponding to the STA; and transmit or receive data according to the particular MU partition and the particular spatial partition. In some example embodiments, the identifiers are a partial access identifier (PAID) of each of the corresponding respective STAs. In further example embodiments, the identifier is a first identifier, and wherein the STA specific part includes a second identifier corresponding to a second particular STA. In still further example embodiments, the order is second and there are two MU partitions, wherein the STA is allocated the second MU partition.

The claimed invention is:

1. One or more non-transitory computer-readable media comprising computer-executable instructions that, when executed by one or more processors, configure the one or more processors to perform operations comprising:
   identifying a first partial access identification (PAID) corresponding to a first station device (STA);
   identifying a second PAID corresponding to a second STA;
   determining a first resource unit (RU) to allocate to the first STA, wherein an indication of first tones of the first RU is associated with a first position of a common part of a signal field of a high efficiency wireless (HEW) preamble, wherein the HEW preamble comprises a first signal field preceding the signal field, and wherein the signal field comprises the common part and an STA specific part;
   determining a second RU to allocate to the second STA, wherein an indication of second tones of the second RU is associated with a second position of the common part;
   determining the STA specific part, wherein the STA specific part comprises an indication of the first PAID and an indication of the second PAID, wherein the indication of the first PAID is in a first position of the STA specific part and the indication of the second PAID is in a second position of the STA specific part, and wherein the first position of the STA specific part is assigned the first position of the common part and the second position of the STA specific part is assigned the second position of the common part; and
   initiating transmission of the HEW preamble.

2. The one or more non-transitory computer-readable media of claim 1, wherein the operations further comprise generating a protocol data unit, wherein the protocol data unit includes the HEW preamble, and wherein the first signal field includes an HE-SIG-A field and the signal field includes an HE-SIG-B field.

3. The one or more non-transitory computer-readable media of claim 1, wherein the signal field further includes a first modulation and coding scheme (MCS) index corresponding to the first STA, a first cyclic redundancy check (CRC) corresponding to a first RU allocation index, a second MCS index corresponding to the second STA, and a second CRC corresponding to a second RU allocation index.

4. The one or more non-transitory computer-readable media of claim 1, wherein the common part indicates an RU allocation pattern corresponding to a mapping of a plurality of RU allocation to corresponding respective RU allocation indices.

5. The one or more non-transitory computer-readable media of claim 1, wherein the first signal field comprises information that enables decoding of the signal field, wherein the information includes at least one of: (i) a modulation and coding scheme (MCS) of the signal field; (ii) a length of the signal field; or (iii) a guard interval of the signal field.

6. The one or more non-transitory computer-readable media of claim 1, wherein the preamble includes a legacy portion configured to provide information for backward compatibility.

7. A wireless device, comprising:
at least one memory that stores computer-executable instructions; and
at least one processor configured to access the at least one memory, wherein the at least one processor is communicatively coupled to a transceiver and is further configured to execute the computer-executable instructions to:
identify a first identifier corresponding to a first station device (STA);
identify a second identifier corresponding to a second STA;
determine a first resource unit (RU) index corresponding to a first RU allocation to the first STA, wherein an indication of first tones of the first RU allocation is associated with a first position of a common part of a signal field of a high efficiency wireless (HEW) preamble, wherein the HEW preamble comprises a first signal field preceding the signal field, and wherein the signal field comprises the common part and an STA specific part;
determine a second RU index corresponding to a second RU allocation to the second STA, wherein an indication of second tones of the second RU allocation is associated with a second position of the common part;
determine the STA specific part, wherein the STA specific part comprises an indication of the first identifier and an indication of the second identifier, wherein the indication of the first identifier is in a first position of the STA specific part and the indication of the second identifier is in a second position of the STA specific part, and wherein the first position of the STA specific part is assigned the first position of the common part and the second position of the STA specific part is assigned the second position of the common part; and initiate transmitting the HEW preamble.

8. The wireless device of claim 7, wherein the first identifier is a partial access identifier (PAID) of the first STA.

9. One or more non-transitory computer-readable media comprising computer-executable instructions that, when executed by one or more processors, configure the one or more processors to perform operations comprising:
identifying a first resource unit (RU) allocation index corresponding to a first RU allocation to a first station device (STA) with a first identifier, wherein an indication of first tones of the first RU allocation is associated with a first position of a common part of a signal field of a high efficiency wireless (HEW) preamble, wherein the HEW preamble comprises a first signal field preceding the signal field, and wherein the signal field comprises the common part and an STA specific part;
identifying a second RU allocation index corresponding to a second RU allocation to a second station device (STA) with a second identifier, wherein an indication of second tones of the second RU allocation is associated with a second position of the common part;
determining the STA specific part, wherein the STA specific part comprises an indication of a first device identifier and an indication of a second device identifier, wherein the indication of the first device identifier is in a first position of the STA specific part and the indication of the second device identifier is in a second position of the STA specific part, and wherein the first position of the STA specific part is assigned the first position of the common part and the second position of the STA specific part is assigned the second position of the common part;
and
causing to send the HEW.

10. The one or more non-transitory computer-readable media of claim 9, wherein the operations further comprise generating a protocol data unit, wherein the protocol data unit includes the HEW preamble, wherein causing to send the HEW preamble comprises causing to send the protocol data unit.

11. A wireless device, comprising:
at least one antenna configured to transmit wireless signals;
a transceiver communicatively coupled to the at least one antenna;
at least one memory that stores computer-executable instructions; and
at least one processor configured to access the at least one memory, wherein the at least one processor is communicatively coupled to the transceiver and is further configured to execute the computer-executable instructions to:
receive a high efficiency wireless (HEW) preamble comprising a first signal field and a second signal field, wherein the second signal field comprises a common part and a station device (STA) specific part;
determine, from the common part, a first resource unit (RU) allocation, wherein an indication of first tones of the first RU allocation is in a first position of the common part, wherein the common part comprises an indication of second tones of a second RU allocation, and wherein the indication of the second RU allocation is in a second position of the common part;
identify, from the STA specific part, a first identifier associated with the wireless device, wherein the first identifier is in a first position of the STA specific part, wherein the STA specific part comprises a second identifier associated with another wireless device, wherein the second identifier is in a second position of the STA specific part, and wherein the first position of the STA specific part is assigned the first position of the common part and the second position of the STA specific part is assigned the second position of the common part; and
initiate transmission or receipt of data according to the first RU allocation.

12. The wireless device of claim 11, wherein the first identifier associated with the wireless device is a partial access identifier (PAID) corresponding to the wireless device.

13. The wireless device of claim 11, wherein the HEW preamble is received, from an access point device, as part of a protocol data unit.

14. One or more non-transitory computer-readable media comprising computer-executable instructions that, when executed by one or more processors, configure the one or more processors to perform operations comprising:

receiving, at a wireless device, a protocol data unit (PDU);

identifying a high efficiency wireless (HEW) preamble of the PDU, the HEW preamble comprising a first signal field and a second signal field, wherein the second signal field comprises a common part and a station device (STA) specific part;

determining a first resource unit (RU) allocation, wherein an indication of first tones of the first RU allocation is in a first position of the common part, wherein the common part comprises an indication of second tones of a second RU allocation, and wherein the indication of the second tones of the second RU allocation is in a second position of the common part; and identifying, from the STA specific part, a first identifier associated with the wireless device, wherein the first identifier is in a first position of the STA specific part, wherein the STA specific part comprises a second identifier associated with another wireless device, wherein the second identifier is in a second position of the STA specific part, and wherein the first position of the STA specific part is assigned the first position of the common part and the second position of the STA specific part is assigned the second position of the common part.

15. The one or more non-transitory computer-readable media of claim 14, wherein the first identifier associated with the wireless device is a partial access identifier (PAID).

16. The one or more non-transitory computer-readable media of claim 14, wherein the first signal field includes an indication bit that indicates operation in at least one of: (i) an orthogonal frequency division multiple access (OFDMA) mode of operation; (ii) a non-OFDMA mode of operation; (iii) a single user mode of operation; or (iv) multi-user (MU) multi-input Multi-output (MIMO) mode of operation.

17. The one or more non-transitory computer-readable media of claim 14, wherein a resource allocation pattern is indicated in the common part by one of: (i) four resource allocation pattern bits for a 20 megahertz (MHz) channel; (ii) five resource allocation pattern bits for a 40 MHz channel; or (iii) five resource allocation pattern bits for a 40 MHz channel.

* * * * *